(12) United States Patent
Sekiguchi et al.

(10) Patent No.: US 12,529,834 B2
(45) Date of Patent: Jan. 20, 2026

(54) MULTILAYER FILM AND IMAGING ELEMENT

(71) Applicant: SONY SEMICONDUCTOR SOLUTIONS CORPORATION, Kanagawa (JP)

(72) Inventors: Koji Sekiguchi, Kanagawa (JP); Kenichi Murata, Kanagawa (JP); Tomiyuki Yukawa, Kanagawa (JP); Masahiro Joei, Kanagawa (JP); Hideaki Togashi, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 571 days.

(21) Appl. No.: 17/904,313

(22) PCT Filed: Feb. 17, 2021

(86) PCT No.: PCT/JP2021/005799
§ 371 (c)(1),
(2) Date: Aug. 16, 2022

(87) PCT Pub. No.: WO2021/172121
PCT Pub. Date: Sep. 2, 2021

(65) Prior Publication Data
US 2023/0056769 A1    Feb. 23, 2023

(30) Foreign Application Priority Data

Feb. 25, 2020  (JP) ................................ 2020-029253

(51) Int. Cl.
*H10K 39/32*     (2023.01)
*G02B 5/20*      (2006.01)
(Continued)

(52) U.S. Cl.
CPC ............. *G02B 5/281* (2013.01); *G02B 5/207* (2013.01); *H04N 23/20* (2023.01); *H10K 39/32* (2023.02)

(58) Field of Classification Search
None
See application file for complete search history.

(56) References Cited

U.S. PATENT DOCUMENTS

| 5,194,989 | A |   | 3/1993 | Ferrante et al. |
| 5,398,133 | A | * | 3/1995 | Tsai ...................... G02B 5/281 359/359 |

(Continued)

FOREIGN PATENT DOCUMENTS

| CN | 104838729 A | 8/2015 |
| CN | 105229791 A | 1/2016 |

(Continued)

OTHER PUBLICATIONS

International Search Report and Written Opinion of PCT Application No. PCT/JP2021/005799, issued on Apr. 13, 2021, 11 pages of ISRWO.

*Primary Examiner* — Bilkis Jahan
(74) *Attorney, Agent, or Firm* — CHIP LAW GROUP

(57) ABSTRACT

A multilayer film according to an embodiment of the present disclosure includes: semiconductor layers; and dielectric layers. In each of the semiconductor layers, a value of an optical constant k1 for light having a wavelength in a visible light region among optical constants k is larger than a value of an optical constant k2 for light having a wavelength in an infrared light region. The optical constants k each serves as an extinction coefficient that includes an imaginary part of a complex refractive index. The semiconductor layers and the dielectric layers are alternately stacked and the multilayer film has an optical distance of 0.3 µm or more and 10 µm or (Continued)

less in a stack direction and absorbs at least a portion of visible light and transmits infrared light.

15 Claims, 14 Drawing Sheets

(51) Int. Cl.
*G02B 5/28* (2006.01)
*H04N 23/20* (2023.01)

(56) References Cited

U.S. PATENT DOCUMENTS

| | | |
|---|---|---|
| 2014/0015932 A1* | 1/2014 | Kim .................... H04N 13/257 348/46 |
| 2014/0194748 A1 | 7/2014 | Yamamoto |
| 2015/0171146 A1* | 6/2015 | Ooki .................. H10F 39/8053 257/40 |

FOREIGN PATENT DOCUMENTS

| | | |
|---|---|---|
| CN | 110809821 A | 2/2020 |
| JP | 2013-070030 A | 4/2013 |
| JP | 2014-135535 A | 7/2014 |
| JP | 2015-533253 A | 11/2015 |
| JP | 2017-208496 A | 11/2017 |
| JP | 2019-134049 A | 8/2019 |
| JP | 2019-186500 A | 10/2019 |
| WO | WO-2019150988 A1 | 8/2019 |

\* cited by examiner

[FIG. 1]
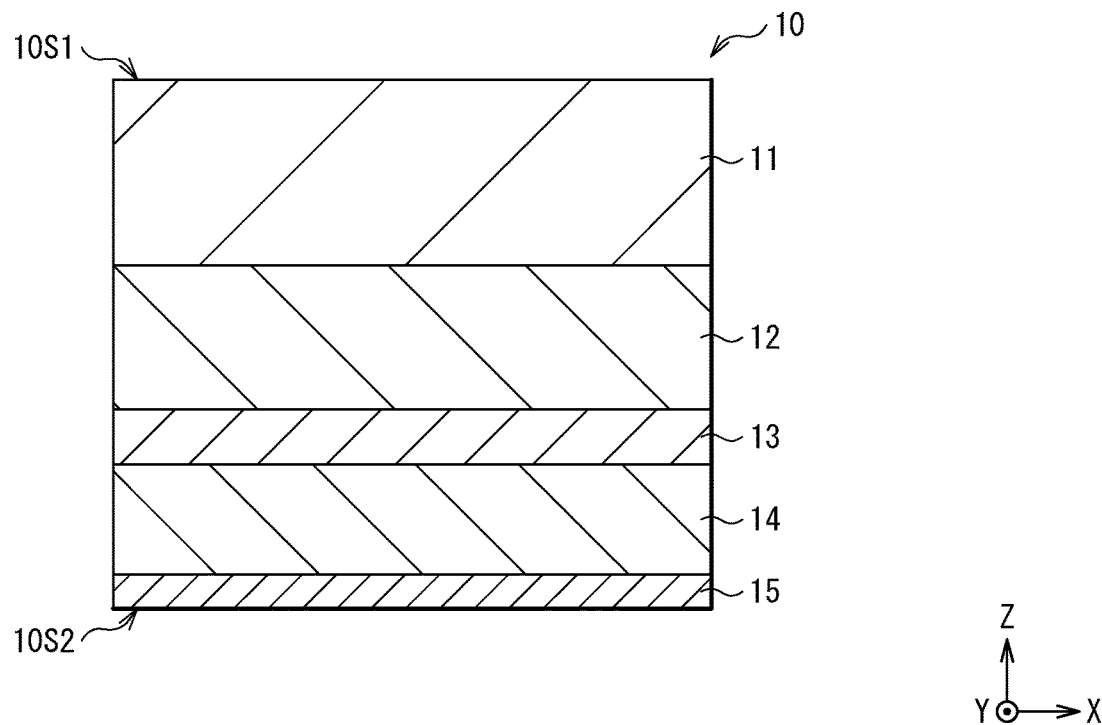
[FIG. 2]
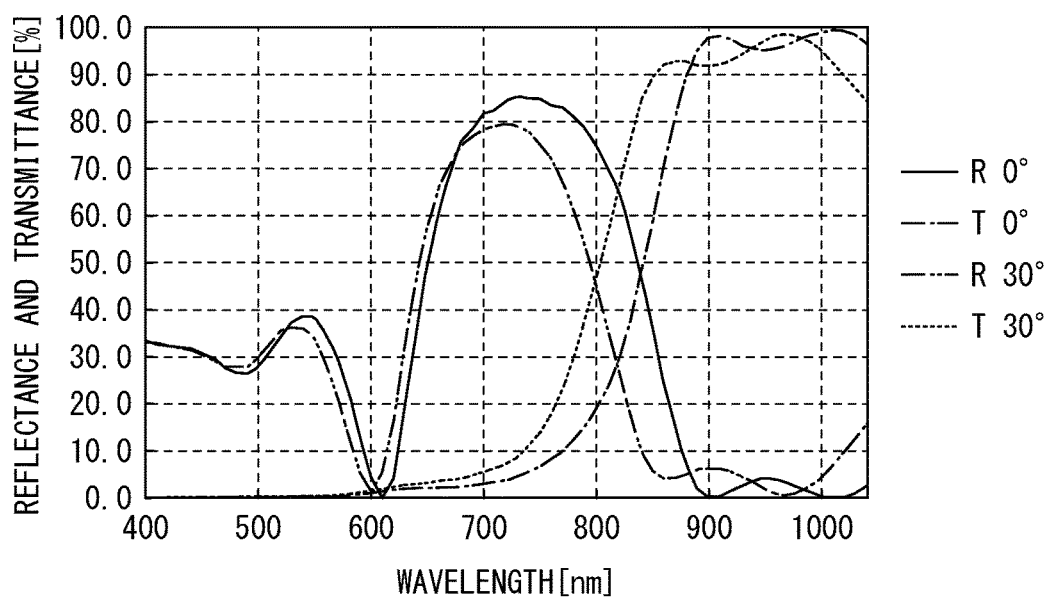

[FIG. 3]
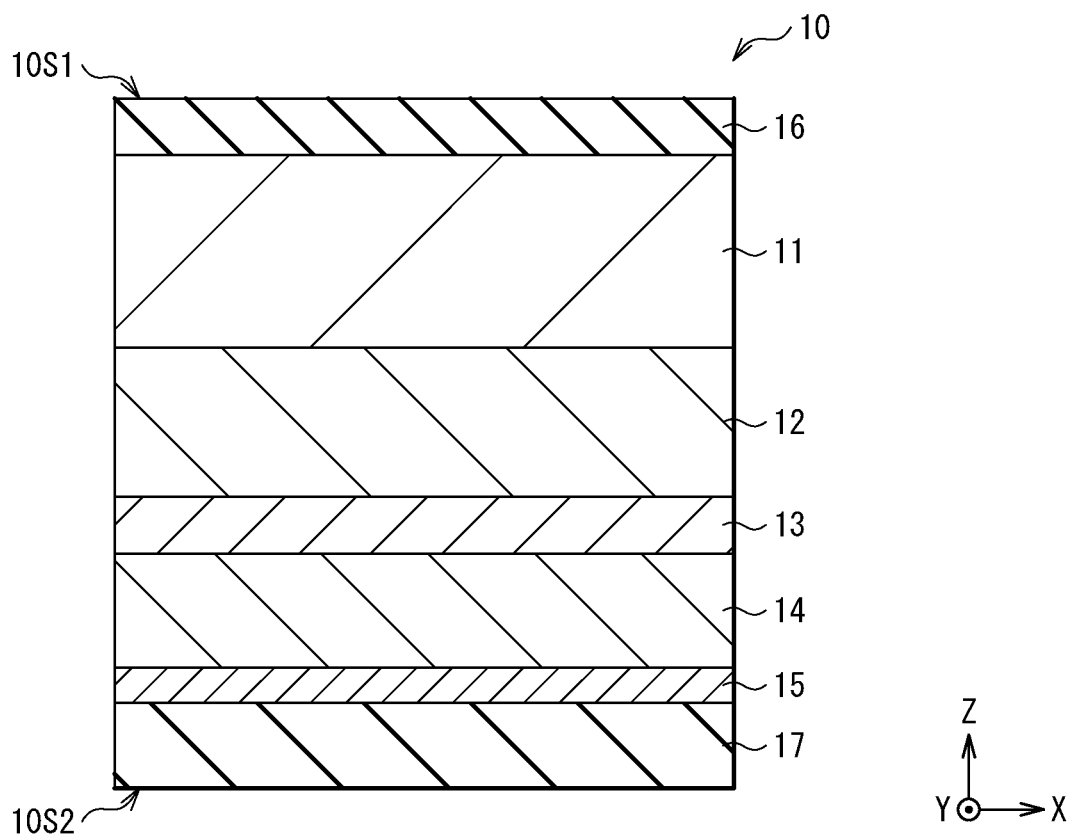

[FIG. 4]
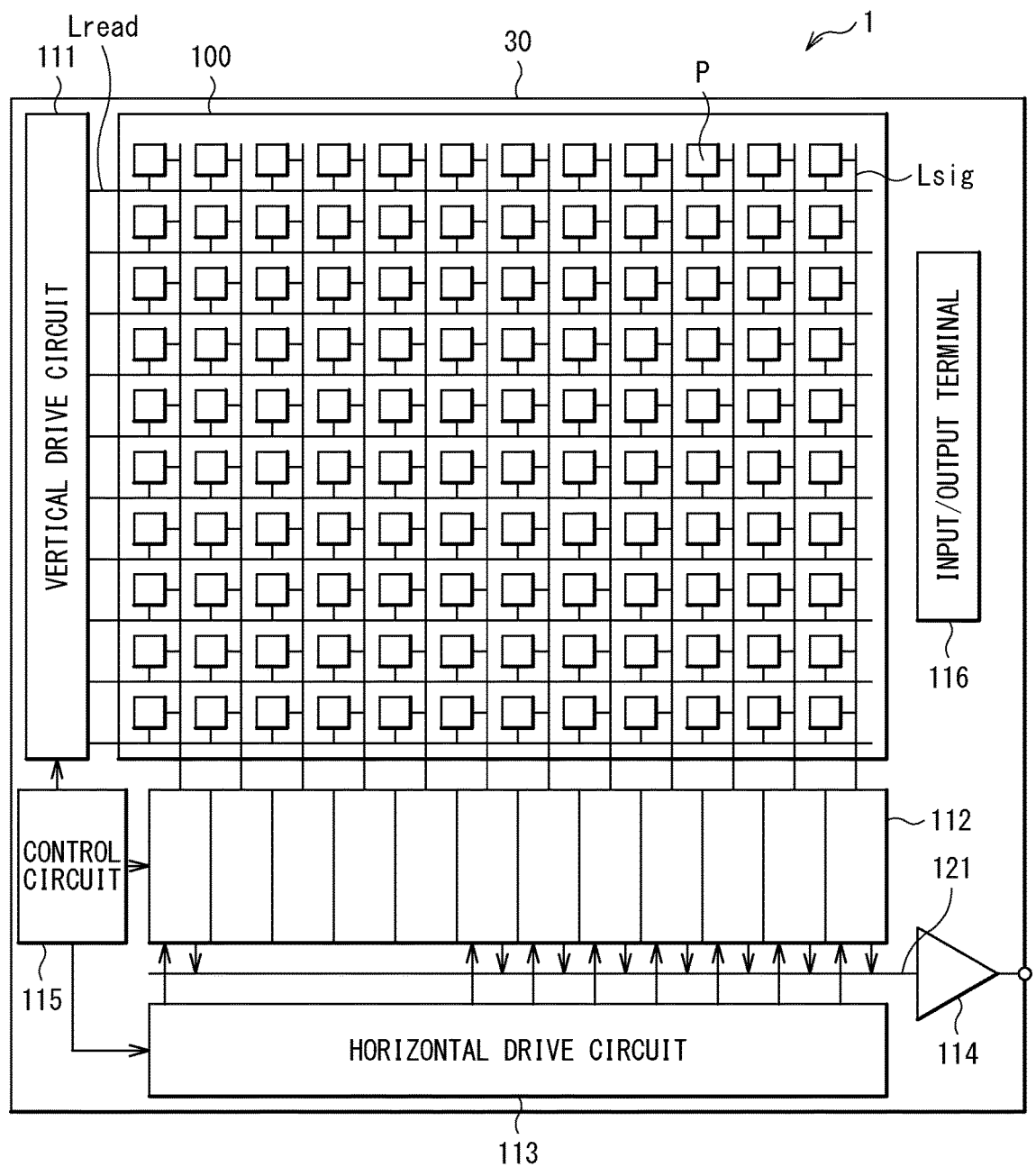

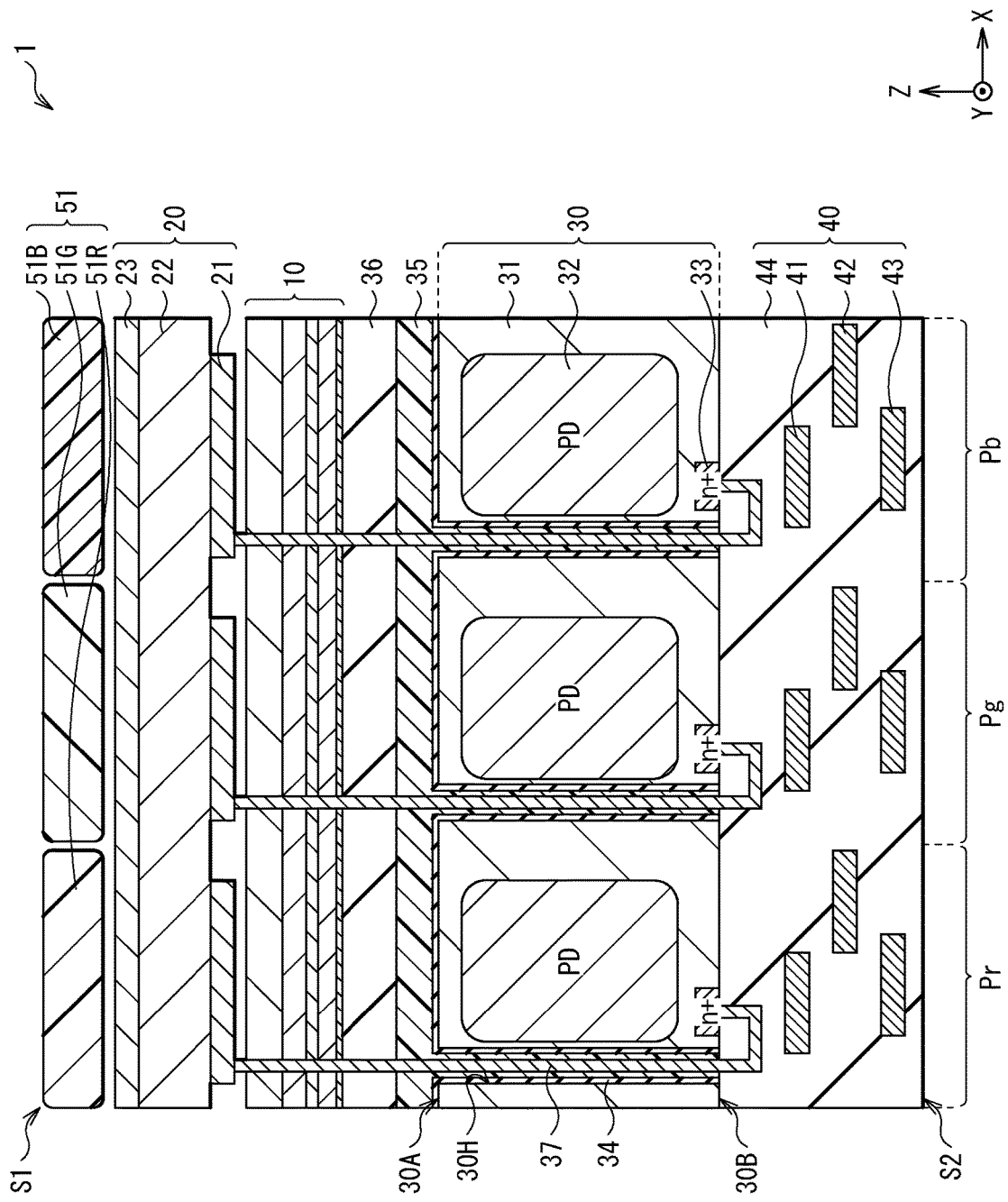
[FIG. 5]

[FIG. 6]
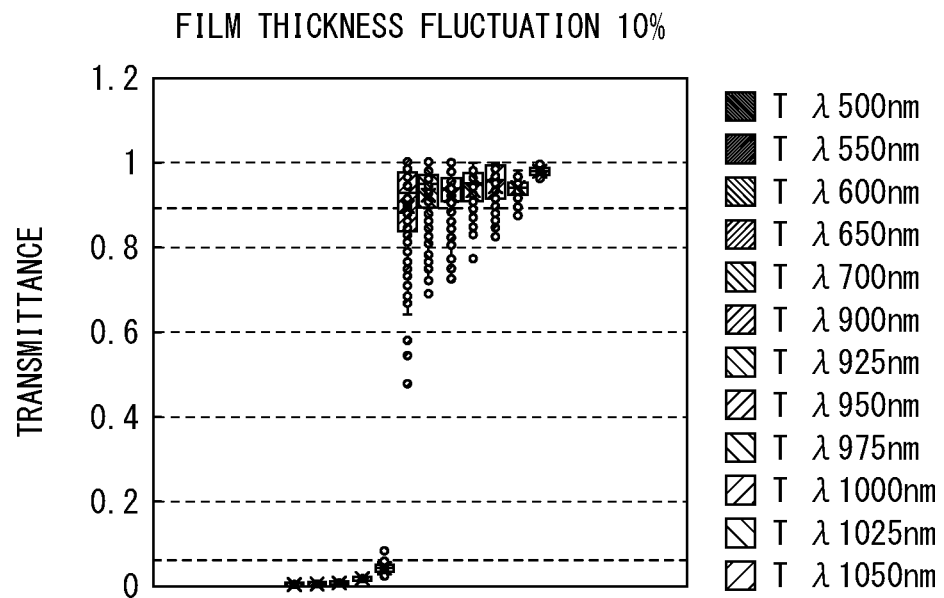
[FIG. 7]
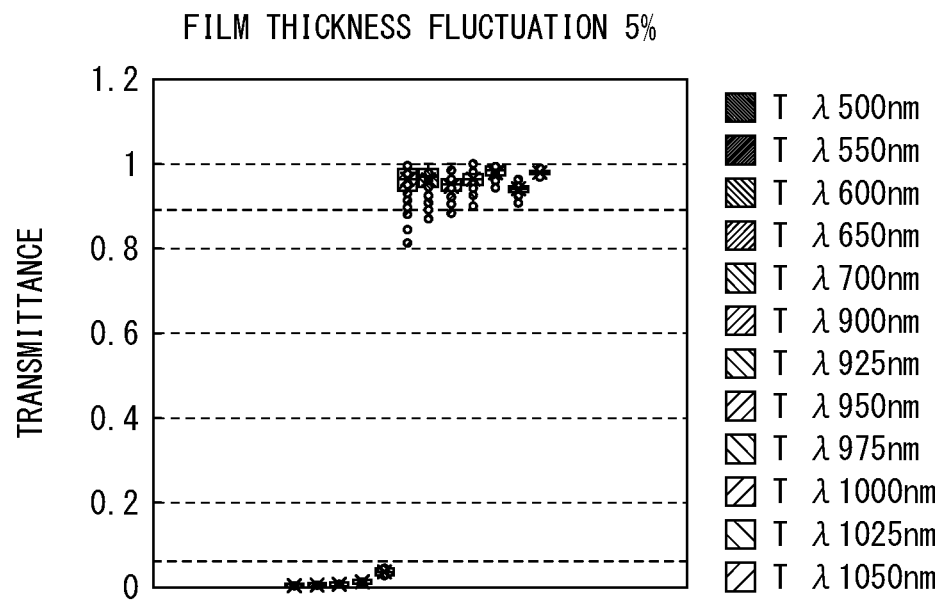

[FIG. 8]
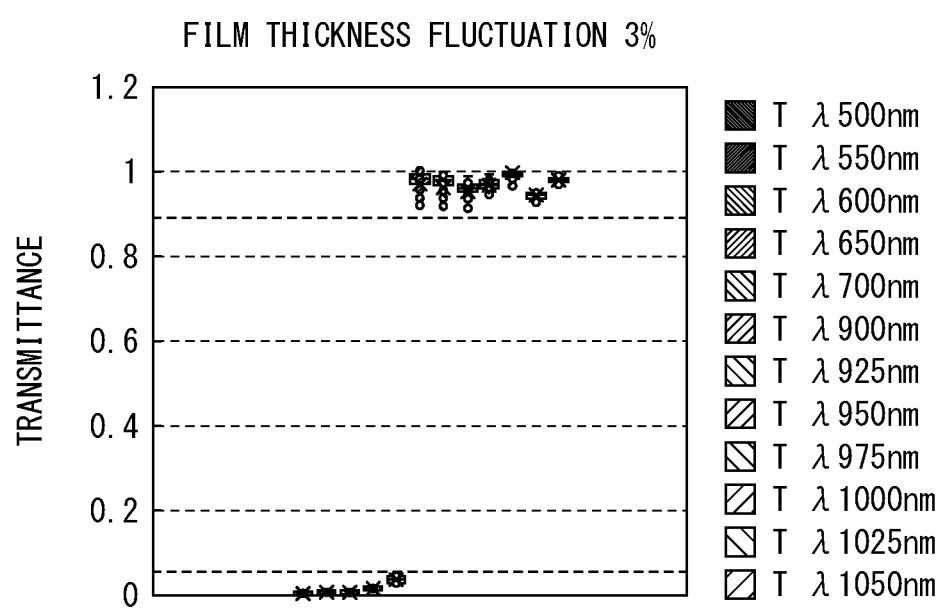

[FIG. 9]
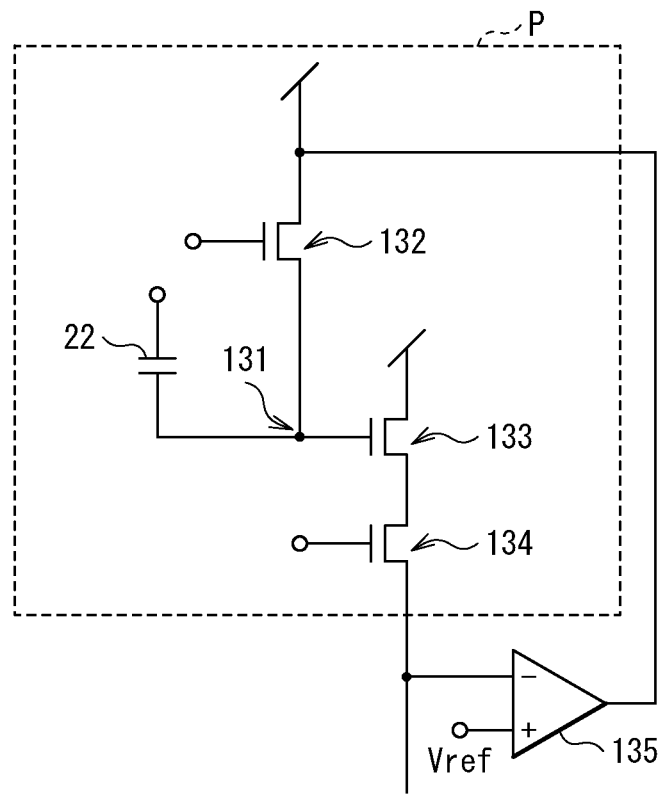
[FIG. 10]
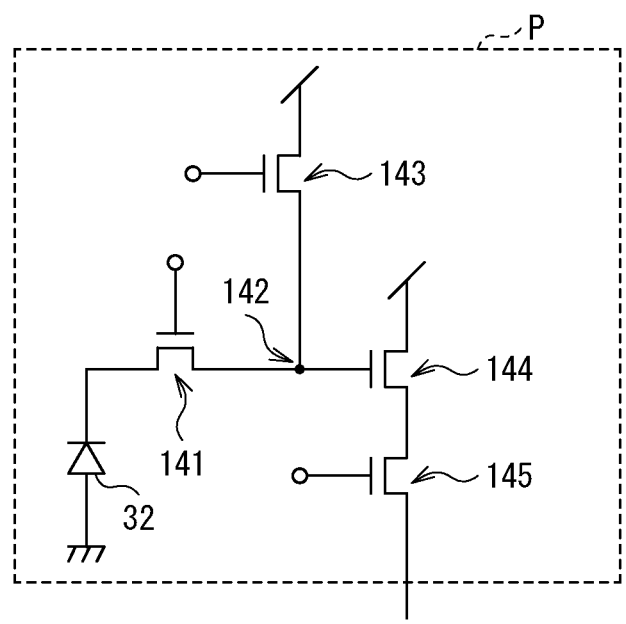

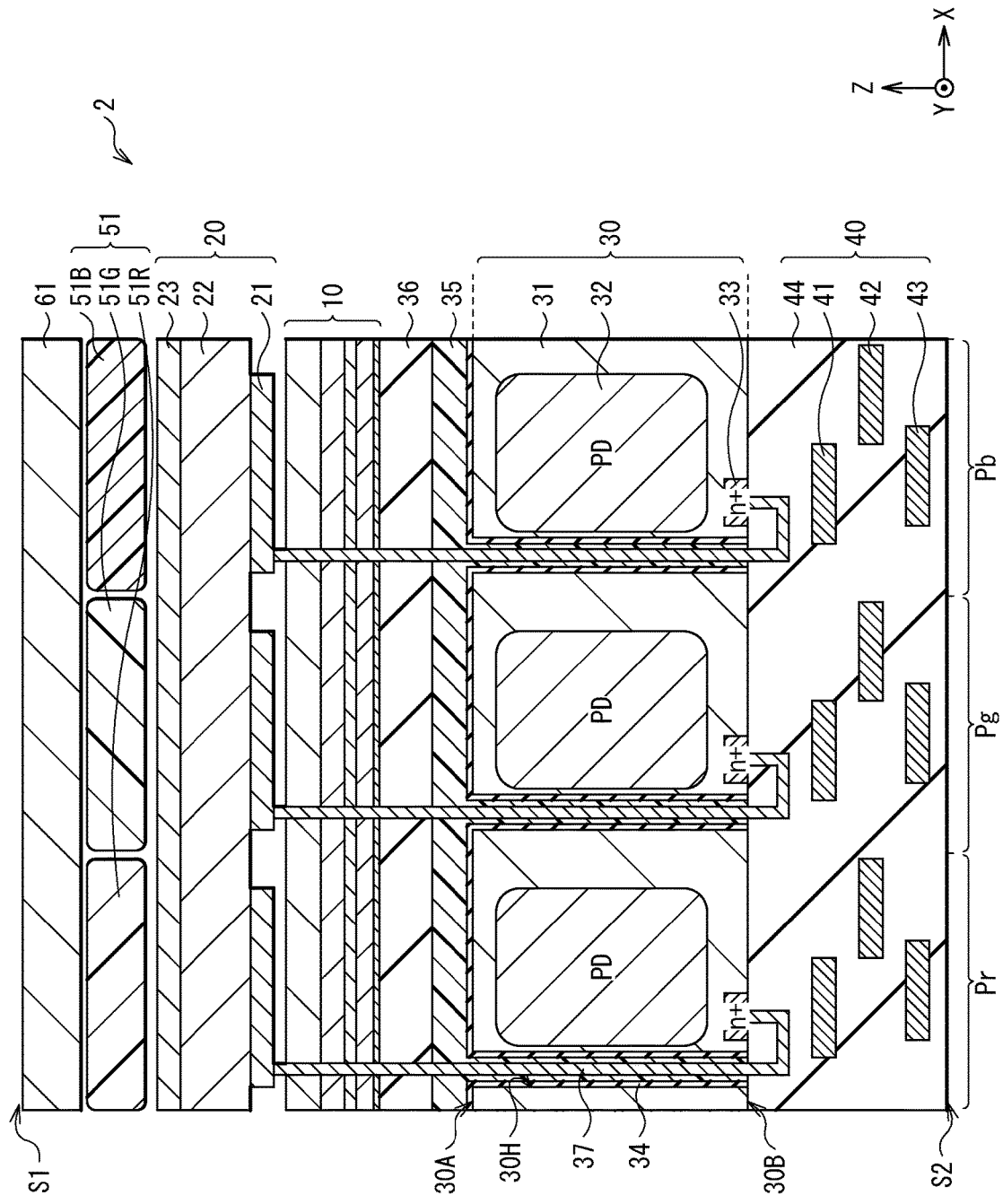
[FIG. 11]

[FIG. 12]
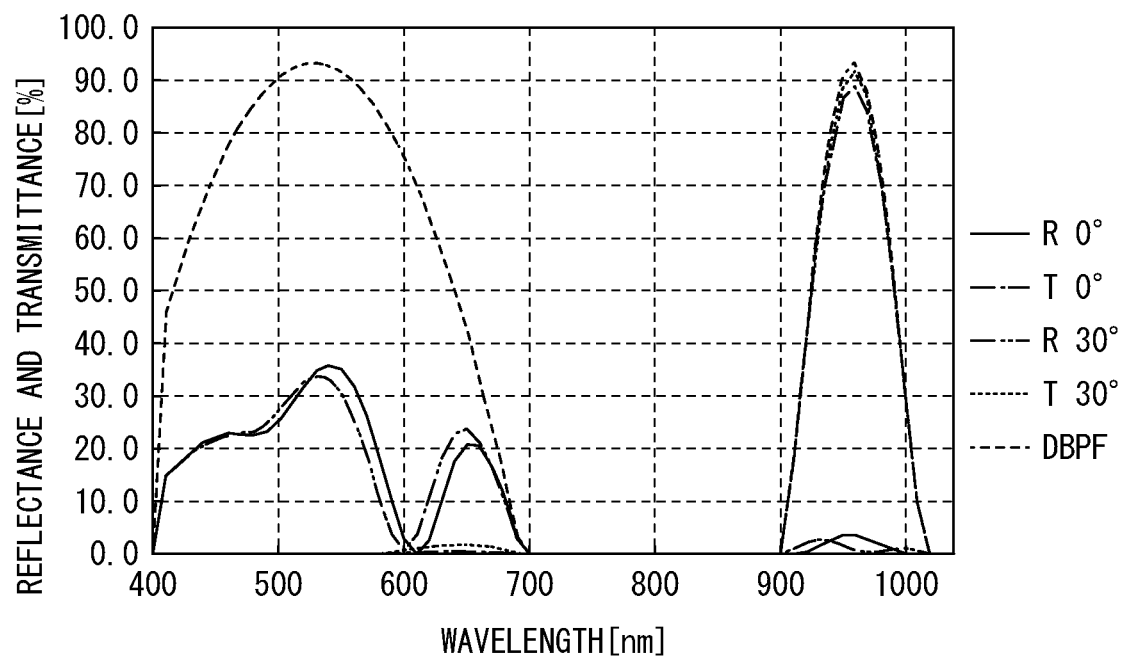

[FIG. 13]
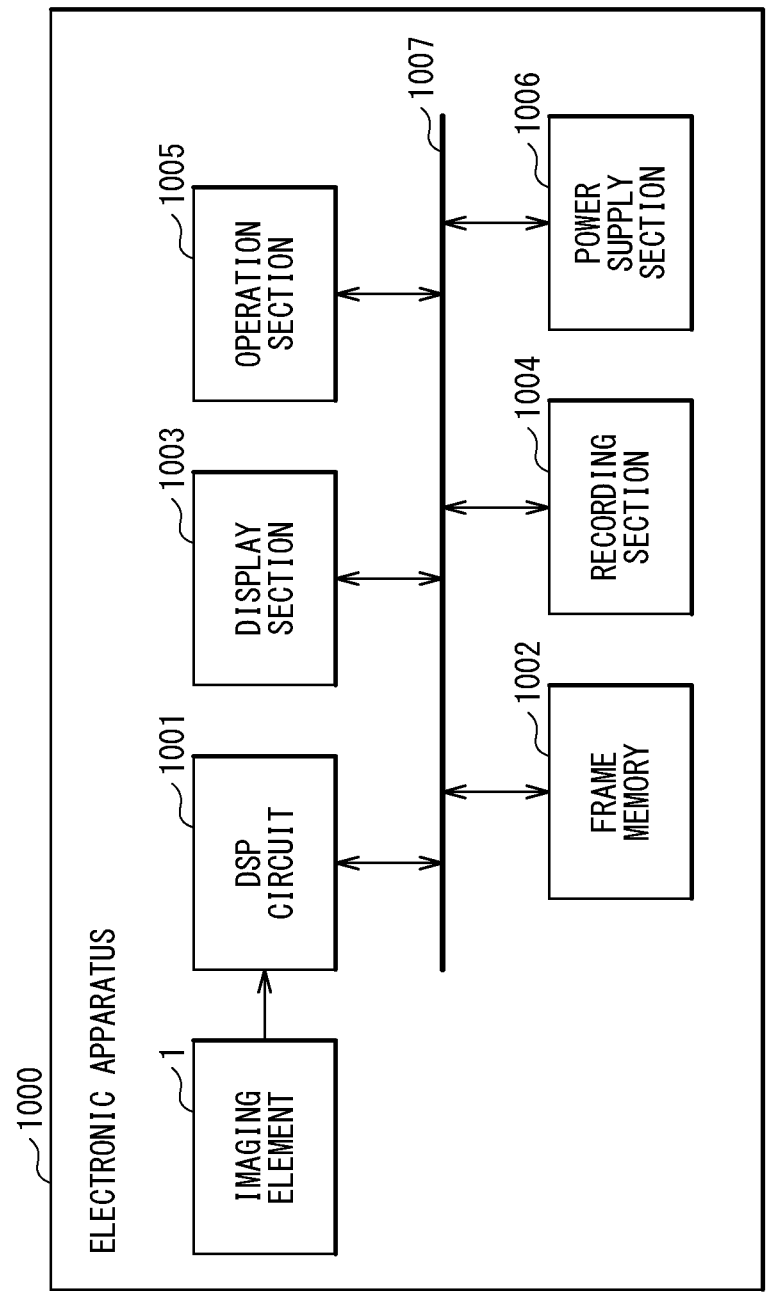

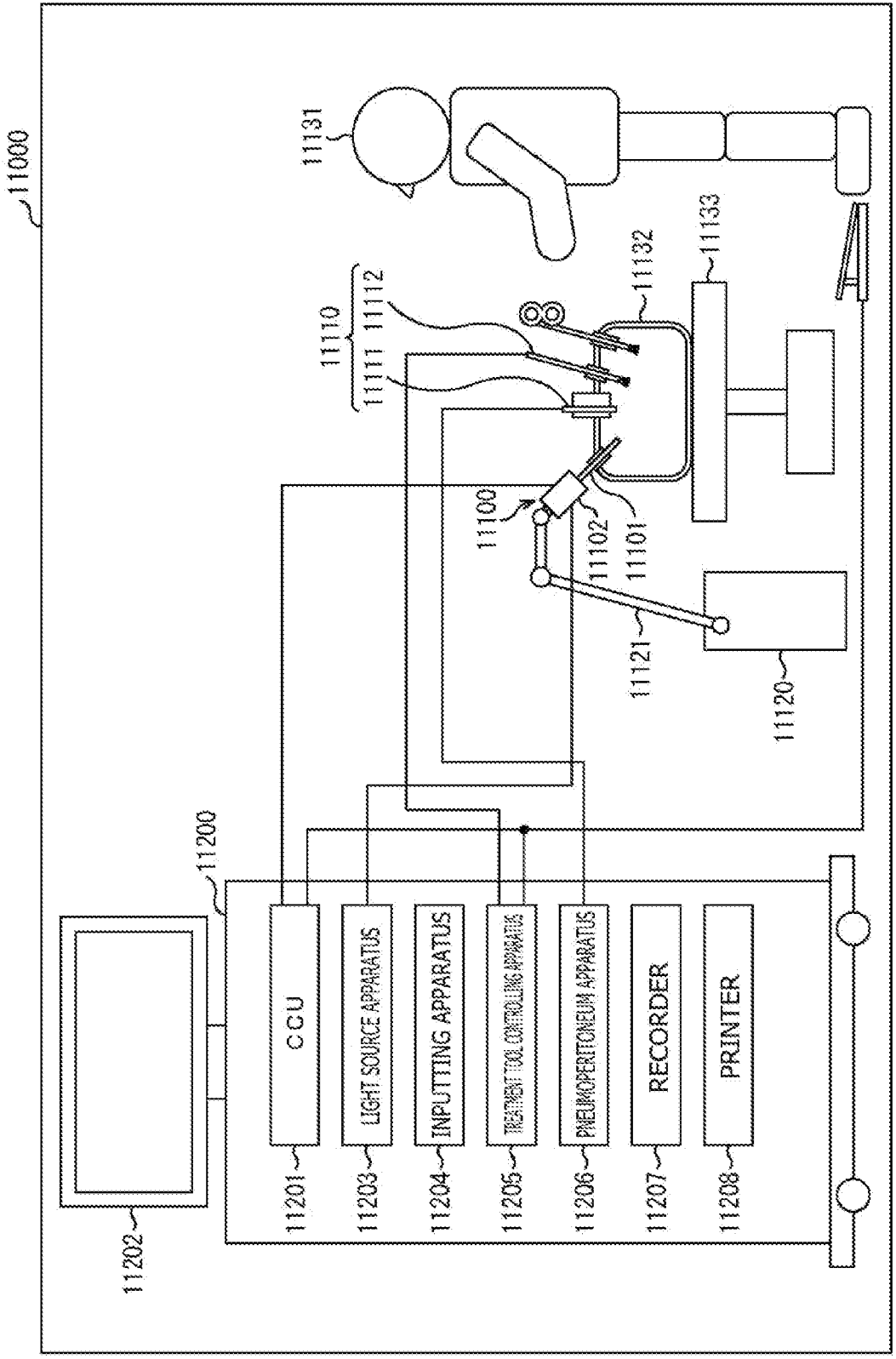
[FIG. 14]

[FIG. 15]
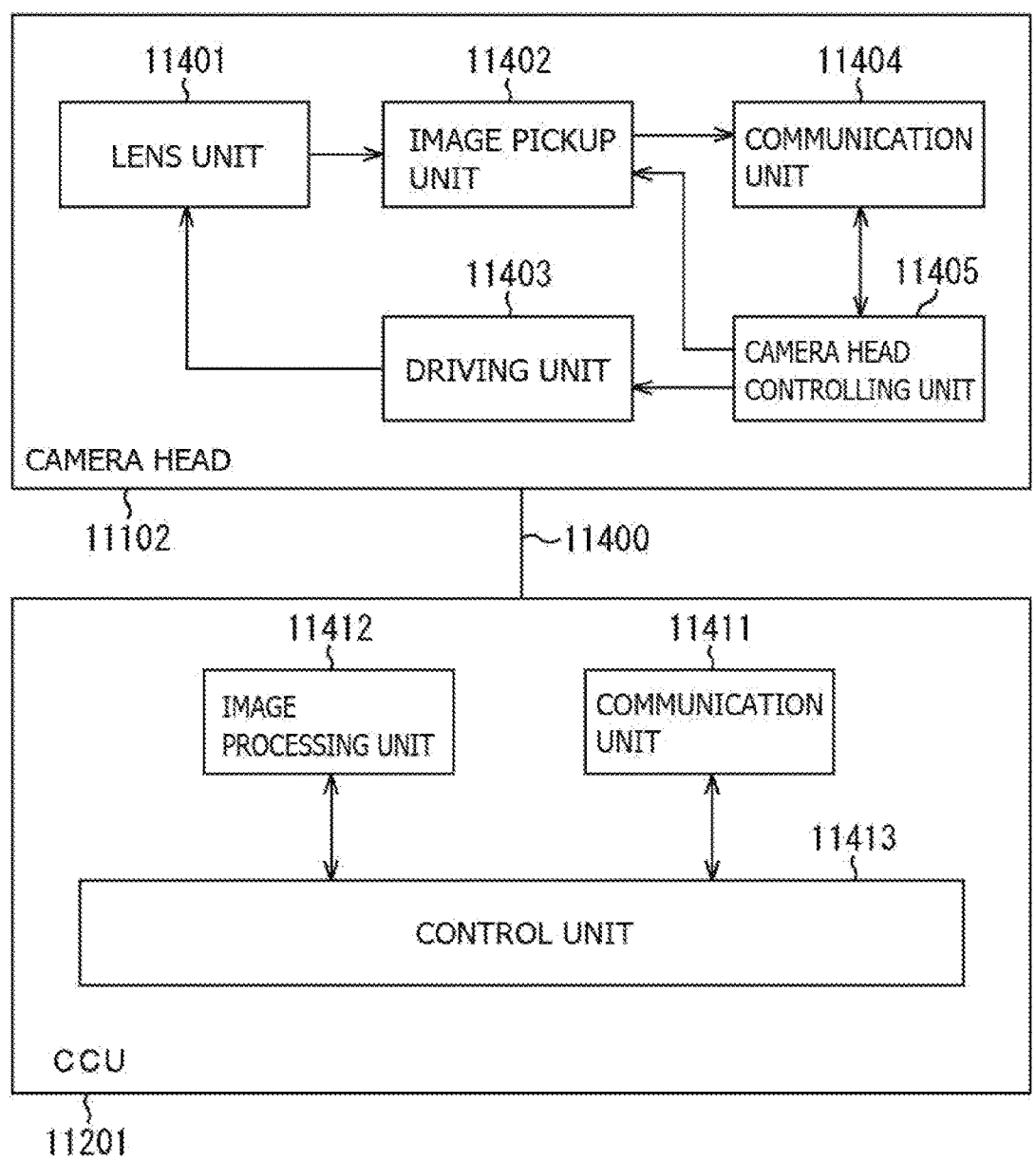

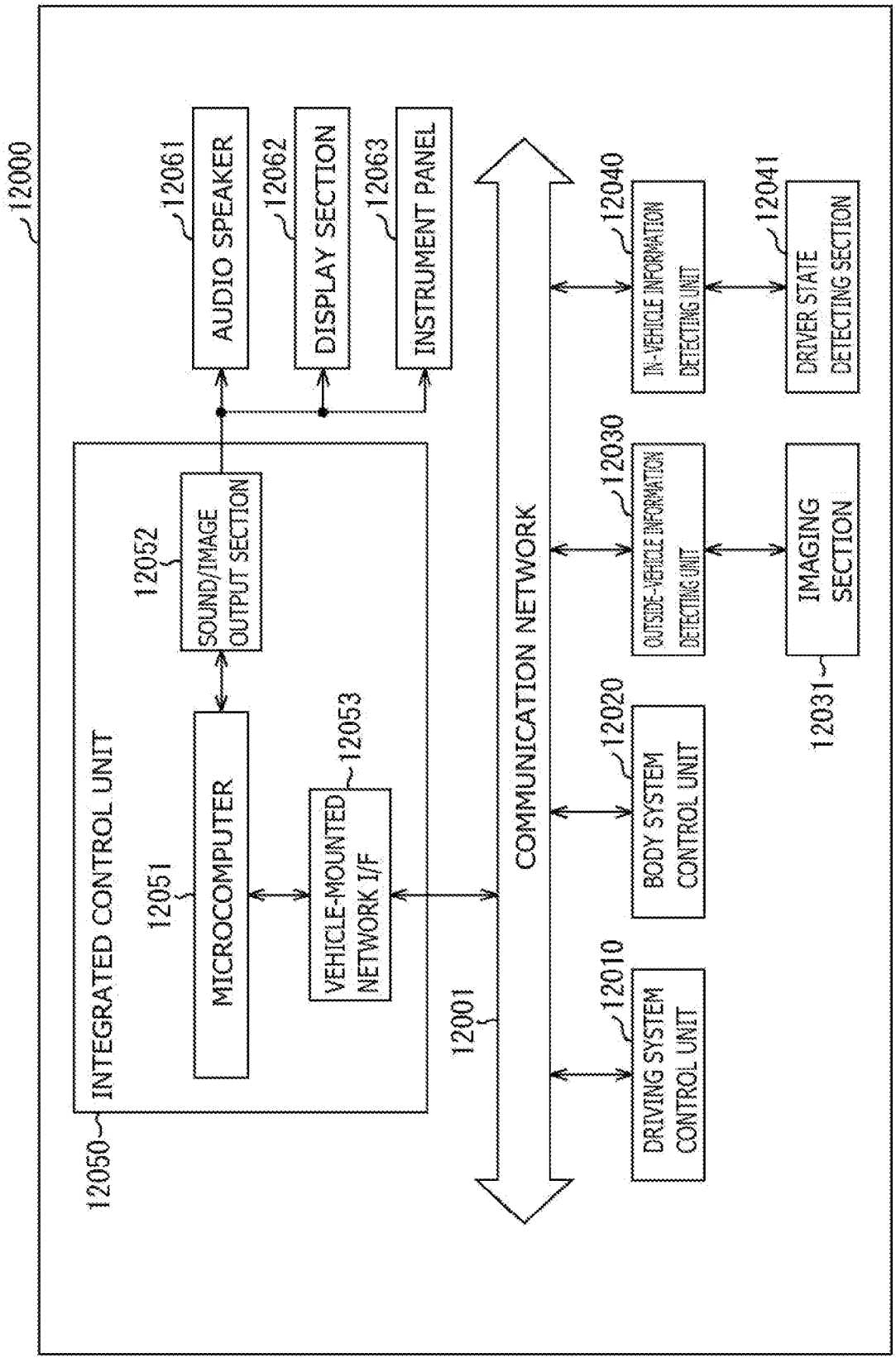
[FIG. 16]

[FIG. 17]
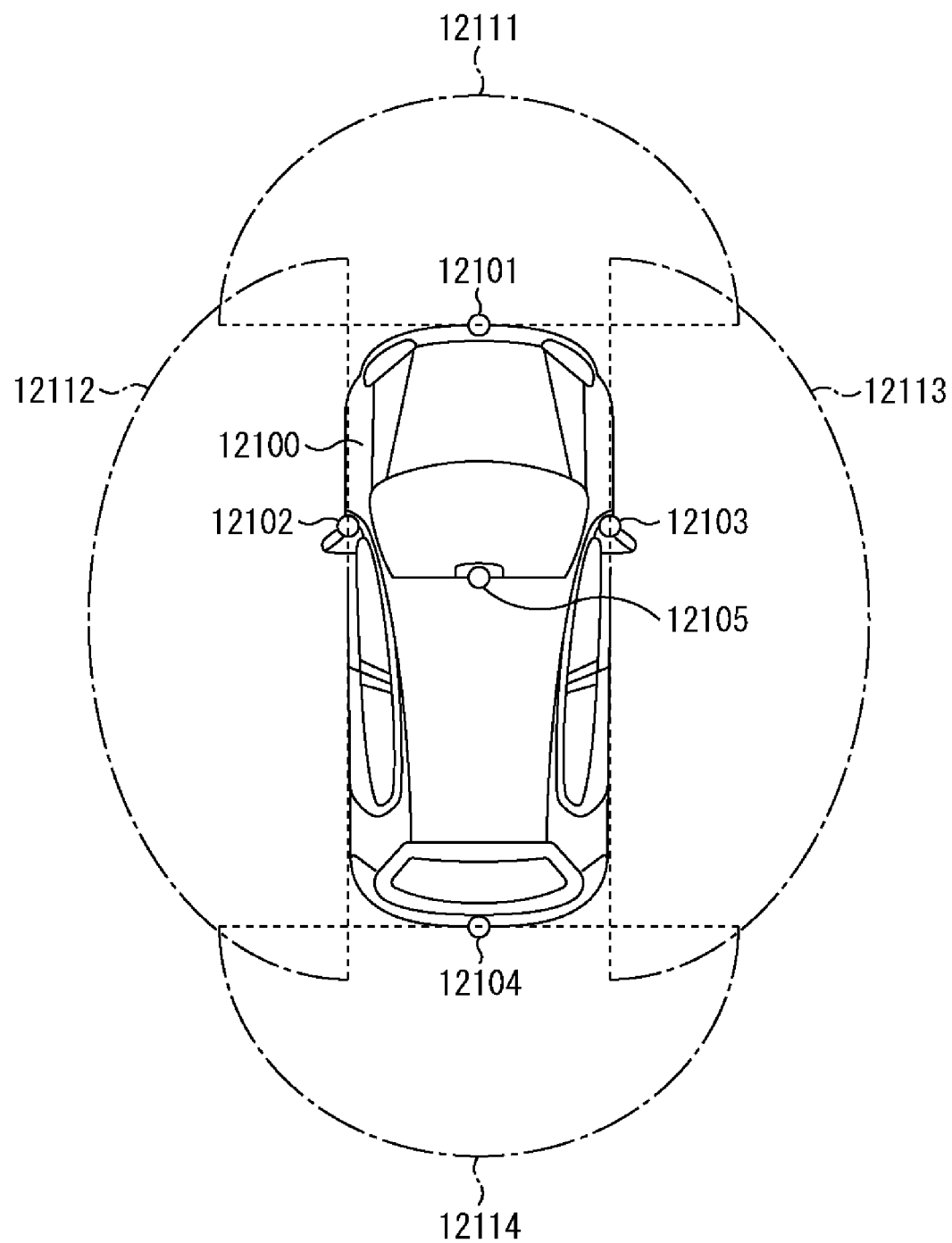

MULTILAYER FILM AND IMAGING ELEMENT

CROSS REFERENCE TO RELATED APPLICATIONS

This application is a U.S. National Phase of International Patent Application No. PCT/JP2021/005799 filed on Feb. 17, 2021, which claims priority benefit of Japanese Patent Application No. JP 2020-029253 filed in the Japan Patent Office on Feb. 25, 2020. Each of the above-referenced applications is hereby incorporated herein by reference in its entirety.

TECHNICAL FIELD

The present disclosure relates, for example, to a multilayer film having a transmission band in an infrared light region and an imaging element including the multilayer film.

BACKGROUND ART

For example, PTL 1 discloses a solid-state imaging device provided with a multilayer film filter between an organic photoelectric conversion film and a semiconductor layer to obtain an infrared light (IR) image having high resolution. A photodiode is formed to be buried in the semiconductor layer. The multilayer film filter has a transmission band in the infrared light region.

CITATION LIST

Patent Literature

PTL 1: Japanese Unexamined Patent Application Publication No. 2017-208496

SUMMARY OF THE INVENTION

Incidentally, an imaging element is requested to have higher image quality in imaging.

It is desirable to provide a multilayer film and an imaging element each of which is allowed to have higher image quality in imaging.

A multilayer film according to an embodiment of the present disclosure includes: semiconductor layers; and dielectric layers. In each of the semiconductor layers, a value of an optical constant k1 for light having a wavelength in a visible light region among optical constants k is larger than a value of an optical constant k2 for light having a wavelength in an infrared light region. The optical constants k each serves as an extinction coefficient that includes an imaginary part of a complex refractive index. The semiconductor layers and the dielectric layers are alternately stacked and the multilayer film has an optical distance of 0.3 μm or more and 10 μm or less in a stack direction and absorbs at least a portion of visible light and transmits infrared light.

An imaging element according to an embodiment of the present disclosure includes: a first photoelectric conversion section; a second photoelectric conversion section; and a multilayer film. The first photoelectric conversion section has sensitivity to light having a wavelength in an infrared light region. The second photoelectric conversion section is stacked on a light incidence surface side of the first photoelectric conversion section. The second photoelectric conversion section has sensitivity to light having a wavelength in a visible light region. The multilayer film is provided between the first photoelectric conversion section and the second photoelectric conversion section. The multilayer film includes semiconductor layers and dielectric layers. In each of the semiconductor layers, a value of an optical constant k1 for light having a wavelength in a visible light region among optical constants k is larger than a value of an optical constant k2 for light having a wavelength in an infrared light region. The optical constants k each serves as an extinction coefficient that includes an imaginary part of a complex refractive index. The semiconductor layers and the dielectric layers are alternately stacked and the multilayer film has an optical distance of 0.3 μm or more and 10 μm or less in a stack direction and absorbs at least a portion of visible light and transmits infrared light.

In the multilayer film according to the embodiment of the present disclosure and the imaging element according to the embodiment, there is provided a multilayer film that has the semiconductor layers and the dielectric layers alternately stacked therein and has an optical distance of 0.3 μm or more and 10 μm or less in the stack direction. In each of the semiconductor layers, the optical constant k1 for the light having the wavelength in the visible light region has a larger value than that of the optical constant k2 for the light having the wavelength in the infrared light region. This multilayer film is disposed between the first photoelectric conversion section and the second photoelectric conversion section. The first photoelectric conversion section has sensitivity to the light having the wavelength in the infrared light region. The second photoelectric conversion section has sensitivity to the light having the wavelength in the visible light region. This causes the multilayer film to absorb at least a portion of the visible light while selectively transmitting the infrared light.

BRIEF DESCRIPTION OF DRAWING

FIG. 1 is a cross-sectional schematic diagram illustrating an example of a configuration of a multilayer film according to an embodiment of the present disclosure.

FIG. 2 is a diagram illustrating reflectance and transmittance of an example of the multilayer film illustrated in FIG. 1 for each wavelength band.

FIG. 3 is a cross-sectional schematic diagram illustrating another example of the configuration of the multilayer film according to the embodiment of the present disclosure.

FIG. 4 is a block diagram illustrating a configuration of an imaging element according to an embodiment of the present disclosure.

FIG. 5 is a cross-sectional schematic diagram illustrating an example of a schematic configuration of the imaging element illustrated in FIG. 1.

FIG. 6 is a characteristic diagram illustrating a change in transmittance on each wavelength in a case where a film thickness of each of layers included in the multilayer film illustrated in FIG. 1 fluctuates within a range of 10%.

FIG. 7 is a characteristic diagram illustrating a change in transmittance on each wavelength in a case where the film thickness of each of layers included in the multilayer film illustrated in FIG. 1 fluctuates within a range of 5%.

FIG. 8 is a characteristic diagram illustrating a change in transmittance on each wavelength in a case where the film thickness of each of layers included in the multilayer film illustrated in FIG. 1 fluctuates within a range of 3%.

FIG. 9 is an equivalent circuit diagram of an organic photoelectric conversion section illustrated in FIG. 5.

FIG. 10 is an equivalent circuit diagram of an inorganic photoelectric conversion section illustrated in FIG. 5.

FIG. 11 is a cross-sectional schematic diagram illustrating an example of a schematic configuration of an imaging element according to a modification example of the present disclosure.

FIG. 12 is a diagram illustrating the reflectance and the transmittance for each wavelength band in a case where the multilayer film and a dual bandpass filter illustrated in FIG. 2 are combined.

FIG. 13 is a block diagram illustrating a configuration example of an electronic apparatus including the imaging element illustrated in FIG. 4.

FIG. 14 is a view depicting an example of a schematic configuration of an endoscopic surgery system.

FIG. 15 is a block diagram depicting an example of a functional configuration of a camera head and a camera control unit (CCU).

FIG. 16 is a block diagram depicting an example of schematic configuration of a vehicle control system.

FIG. 17 is a diagram of assistance in explaining an example of installation positions of an outside-vehicle information detecting section and an imaging section.

MODES FOR CARRYING OUT THE INVENTION

The following describes an embodiment of the present disclosure in detail with reference to the drawings. The following description is a specific example of the present disclosure, but the present disclosure is not limited to the following modes. In addition, the present disclosure is not also limited to the disposition, dimensions, dimension ratios, and the like of the respective components illustrated in the respective diagrams. It is to be noted that description is given in the following order.

1. Embodiment (examples of a multilayer film in which semiconductor layers and dielectric layers are alternately stacked and an imaging element including the multilayer film)
1-1. Configuration of Multilayer Film
1-2. Configuration of Imaging Element
1-3. Workings and Effects
2. Modification Example (an example of an imaging element further including a dual bandpass filter on a light incidence side)
3. Application Example
4. Practical Application Examples

1. EMBODIMENT

FIG. 1 schematically illustrates an example of a cross-sectional configuration of a multilayer film (multilayer film 10) according to an embodiment of the present disclosure. The multilayer film 10 is used for an imaging element (e.g., imaging element 1; see FIG. 4) described below and has a transmission band in the infrared light region.

1-1. Configuration of Multilayer Film

The multilayer film 10 according to the present embodiment absorbs at least a portion of light having a wavelength in the visible light region (wavelengths of 400 nm or more and 700 nm or less) while selectively transmitting light having a wavelength in the infrared light region (wavelengths of 880 nm or more and 1040 nm or less). The multilayer film 10 according to the present embodiment has a configuration in which semiconductor layers and dielectric layers are alternately stacked and the optical distance in the stack direction (e.g., Z axis direction) is 0.3 µm or more and 10 µm or less. In each of the semiconductor layers, for example, the value of an optical constant k1 for light (that is referred to simply as visible light below) having a wavelength in the visible light region among optical constants k is larger than the value of an optical constant k2 for light (that is referred to simply as infrared light below) having a wavelength in the infrared light region. Each of the optical constants k serves as an extinction coefficient that is the imaginary part of a complex refractive index.

In the multilayer film 10, for example, three semiconductor layers (a first semiconductor layer 11, a second semiconductor layer 13, and a third semiconductor layer 15) and two dielectric layers (a first dielectric layer 12 and a second dielectric layer 14) are alternately stacked. Specifically, the first semiconductor layer 11, the first dielectric layer 12, the second semiconductor layer 13, the second dielectric layer 14, and the third semiconductor layer 15 are stacked in the multilayer film 10 in this order. Light comes from the first semiconductor layer 11 side. In other words, the upper surface of the first semiconductor layer 11 is a light incidence surface (surface 10S1).

It is possible to form each of the semiconductor layers (the first semiconductor layer 11, the second semiconductor layer 13, and the third semiconductor layer 15) by using, for example, silicon (Si), germanium (Ge), and silicon germanium (SiGe) and any amorphous material (amorphous) thereof. It is possible to form each of the dielectric layers (the first dielectric layer 12 and the second dielectric layer 14) by using, for example, any of silicon oxide ($SiO_x$), silicon nitride ($SiN_x$), silicon oxynitride ($SiO_xN_y$), silicon carbide (SiC), aluminum oxide ($AlO_x$), magnesium fluoride ($MgF_x$), or the like.

The respective film thicknesses of the first semiconductor layer 11, the first dielectric layer 12, the second semiconductor layer 13, the second dielectric layer 14, and the third semiconductor layer 15 included in the multilayer film 10 are not limited in particular as long as the optical distance (that is referred to simply as optical distance below) of the multilayer film 10 in the stack direction is 0.3 µm or more and 10 µm or less as described above. Here, 10 µm, which is the upper limit of the optical distance of the multilayer film 10, is defined from optical distance (about 10 to 11 µm and an actual film thickness of 2.3 µm) that allows a single film of amorphous silicon to have a transmittance of 5% or less for visible light. 0.3 µm, which is the lower limit of the optical distance of the multilayer film 10, is defined as follows. In a case where the layer thickness is set as d, the wavelength is set as k, and the refractive index is set as n in the multilayer film configuration, the waves reflected at the interface are cancelled by setting optical distance nd thereof as λ/4 to make it possible to suppress the transmission. A 3-layer configuration of a dielectric layer/a semiconductor layer/a dielectric layer is possible as the minimum configuration of the multilayer film 10 according to the present embodiment. The respective layers have optical distances of 0.1 µm/0.1 µm/0.1 µm on the 400-nm wavelength in the visible light region to suppress the transmission of visible light by multiple reflection by this 3-layer configuration. 0.3 µm (an actual film thickness of about 0.16 µm) is thus set.

FIG. 2 illustrates the reflectance and the transmittance of the multilayer film 10 for each wavelength band. In the multilayer film 10, amorphous silicon is used as the first semiconductor layer 11, the second semiconductor layer 13, and the third semiconductor layer 15 and silicon oxide is used as the second dielectric layer 14 and the third semiconductor layer 15. The film thickness of each of the layers is set within the range of the optical distance of the multilayer film 10 described above. It is to be noted that R0° and T0° in the diagram represent the reflectance (R) and the transmittance (T) of light incident on the multilayer film 10 at 0° (vertical incidence). R30° and T30° represent the reflectance (R) and the transmittance (T) of light incident on the multilayer film 10 at 30° (oblique incidence). This multilayer film 10 is a multilayer film having an optical distance of 1.3 μm and an actual film thickness of 410 nm. The respective layers have actual film thicknesses of 150 nm (first semiconductor layer 11)/110 nm (first dielectric layer 12)/40 nm (second semiconductor layer 13)/80 nm (second dielectric layer 14)/30 nm (third semiconductor layer 15). Although the multilayer film 10 having the configuration described above is a thin film having an actual film thickness of 410 nm, the multilayer film 10 has a transmittance of about 5% or less for visible light and a reflectance of about 35% on average in the visible range. About 65% of visible light is absorbed. In addition, the reflectance of the infrared light is about 5% or less.

As described above, the multilayer film 10 according to the present embodiment absorbs a portion of visible light while selectively transmitting infrared light. This reduces the reflection of visible light onto the light incidence surface (surface 11S1) side.

It is to be noted that the multilayer film 10 is not necessarily limited to the layer structure illustrated in FIG. 1 as long as the optical distance in the stack direction is 0.3 μm or more and 10 μm or less. For example, the multilayer film 10 illustrated in FIG. 1 has a configuration in which the five layers of three semiconductor layers (the first semiconductor layer 11, the second semiconductor layer 13, and the third semiconductor layer 15) and two dielectric layers (the first dielectric layer 12 and the second dielectric layer 14) are stacked in total. However, for example, in a case where four or five or more semiconductor layers and three or four or more dielectric layers are alternately stacked, it is also possible to obtain similar characteristics. In addition, even in a case where two semiconductor layers and one dielectric layer are alternately stacked, it is possible to obtain similar characteristics.

Further, the multilayer film 10 may have another layer. For example, as illustrated in FIG. 3, there may be respectively provided protective layers 16 and 17 in the upper layer of the first semiconductor layer 11 and the lower layer of the third semiconductor layer 15. Each of the protective layers 16 and 17 includes, for example, silicon oxide ($SiO_x$) or the like.

1-2. Configuration of Imaging Element

FIG. 4 illustrates an example of an overall configuration of an imaging element (imaging element 1) according to an embodiment of the present disclosure. The imaging element 1 is, for example, a CMOS (Complementary Metal Oxide Semiconductor) image sensor. The imaging element 1 takes in incident light (image light) from a subject through an optical lens system (not illustrated). The imaging element 1 converts the amount of incident light formed on the imaging surface as an image into electric signals in units of pixels and outputs the electric signals as pixel signals. The imaging element 1 includes a pixel section 100 serving as an imaging area on a semiconductor substrate 30. The imaging element 1 includes, for example, a vertical drive circuit 111, a column signal processing circuit 112, a horizontal drive circuit 113, an output circuit 114, a control circuit 115, and an input/output terminal 116 in a peripheral region of this pixel section 100.

The pixel section 100 includes, for example, a plurality of unit pixels P that is two-dimensionally disposed in a matrix. These unit pixels P are provided with a pixel drive line Lread (specifically, a row selection line and a reset control line) for each of the pixel rows and provided with a vertical signal line Lsig for each of the pixel columns. The pixel drive line Lread is for transmitting drive signals for reading out signals from the pixels. One end of the pixel drive line Lread is coupled to an output terminal corresponding to each of the rows of the vertical drive circuit 111.

The vertical drive circuit 111 includes a shift register, an address decoder, and the like and is a pixel driver that drives the respective unit pixels P of the pixel section 100, for example, in units of rows. The signals outputted from the respective unit pixels P in the pixel rows selectively scanned by the vertical drive circuit 111 are supplied to the column signal processing circuits 112 through the respective vertical signal lines Lsig. Each of the column signal processing circuits 112 includes an amplifier, a horizontal selection switch, and the like that are provided for each of the vertical signal lines Lsig.

The horizontal drive circuit 113 includes a shift register, an address decoder, and the like and drives the respective horizontal selection switches of the column signal processing circuits 112 in order while scanning the horizontal selection switches. This selective scanning by the horizontal drive circuit 113 outputs the signals of the respective pixels transmitted through the respective vertical signal lines Lsig to a horizontal signal line 121 in order and transmits the signals to the outside of the semiconductor substrate 30 through the horizontal signal line 121.

The output circuit 114 performs signal processing on the signals sequentially supplied from the respective column signal processing circuits 112 through the horizontal signal line 121 and outputs the signals. The output circuit 114 performs, for example, only buffering in some cases and performs black level adjustment, column variation correction, various kinds of digital signal processing, and the like in other cases.

The circuit portions including the vertical drive circuit 111, the column signal processing circuit 112, the horizontal drive circuit 113, the horizontal signal line 121, and the output circuit 114 may be formed directly on the semiconductor substrate 30 or may be provided in external control IC. In addition, those circuit portions may be formed in another substrate coupled by a cable or the like.

The control circuit 115 receives a clock supplied from the outside of the semiconductor substrate 30, data for an instruction about an operation mode, and the like and also outputs data such as internal information of the imaging element 1. The control circuit 115 further includes a timing generator that generates a variety of timing signals and controls the driving of peripheral circuits such as the vertical drive circuit 111, the column signal processing circuit 112, and the horizontal drive circuit 113 on the basis of the variety of timing signals generated by the timing generator.

The output terminal 116 exchanges signals with the outside.

FIG. 5 schematically illustrates an example of a cross-sectional configuration of each of the unit pixels P illustrated in FIG. 4.

The imaging element 1 is an imaging element of a so-called vertical spectral type in which one organic photoelectric conversion section 20 and one inorganic photoelectric conversion section 32 are stacked in each of the plurality of unit pixels P in the vertical direction (e.g., Z axis direction). The plurality of unit pixels P is two-dimensionally disposed in a matrix in the pixel section 100.

The inorganic photoelectric conversion section 32 includes, for example, a photodiode PD that is formed to be buried in the semiconductor substrate 30. The semiconductor substrate 30 has a first surface 30A (back surface) and a second surface 30B (front surface) that are opposed to each other. The organic photoelectric conversion section 20 is provided closer to a light incidence side S1 than the inorganic photoelectric conversion section 32. Specifically, the organic photoelectric conversion section 20 is provided on the first surface 30A side of the semiconductor substrate 30. The organic photoelectric conversion section 20 includes an organic photoelectric conversion layer 22, for example, between a lower electrode 21 and an upper electrode 23. The lower electrode 21 and the upper electrode 23 are disposed to be opposed to each other. The organic photoelectric conversion layer 22 is formed by using an organic material. The organic photoelectric conversion section 20 and the inorganic photoelectric conversion section 32 each detect light in a different wavelength band and perform photoelectric conversion. Specifically, the organic photoelectric conversion section 20 detects a portion or all of the wavelengths in the visible light region (e.g., wavelengths of 400 nm or more and 700 nm or less) and the inorganic photoelectric conversion section 32 detects a portion or all of the wavelengths in the infrared light region (wavelengths of 880 nm or more and 1040 nm or less).

The second surface 30B of the semiconductor substrate 30 is provided, for example, with an electric charge holding section 33, a readout circuit, and a multilayer wiring layer 40. The readout circuit includes, for example, a transfer transistor (TG), an amplification transistor (AMP), a reset transistor (RST), a selection transistor (SEL), and the like. In the multilayer wiring layer 40, for example, wiring layers 41, 42, and 43 are stacked in an insulating layer 44.

A fixed electric charge layer 34, an anti-reflection layer 35, and an interlayer insulating layer 36 are stacked on the first surface 30A of the semiconductor substrate 30 in this order. The fixed electric charge layer 34 further extends on the side surface of a through hole 30H that extends between the first surface 30A and the second surface 30B of the semiconductor substrate 30. The anti-reflection layer 35 is formed to further fill the inside of the through hole 30H.

There is provided a through electrode 37 in the through hole 30H that extends between the first surface 30A and the second surface 30B of the semiconductor substrate 30. The through electrode 37 has a function of a connector between the organic photoelectric conversion section 20 and the electric charge holding section 33. The through electrode 37 serves as a transmission path of the signal charge generated by the organic photoelectric conversion section 20. The organic photoelectric conversion section 20 is provided on the first surface 30A side of the semiconductor substrate 30. The electric charge holding section 33 is provided on the second surface 30B of the semiconductor substrate 30. This allows the each of the unit pixels P to favorably transfer the signal charge generated by the organic photoelectric conversion section 20 on the first surface 30A side of the semiconductor substrate 30 to the second surface 30B side of the semiconductor substrate 30 through the through electrode 37 and increase the characteristics. For example, the fixed electric charge layer 34 and the anti-reflection layer 35 are provided around the through electrode 37. This electrically insulates the through electrode 37 and a p-well 31.

It is to be noted that FIG. 5 illustrates the back surface (first surface 30A) side of the semiconductor substrate 30 as the light incidence side S1 and the front surface (second surface 30B) side thereof as a wiring layer side S2.

There are provided color filters 51 (color filters 51R, 51G, and 51B) above the organic photoelectric conversion section 20 (light incidence side S1) for the respective unit pixels P (unit pixels Pr, Pg, and Pb). The color filters 51 (color filters 51R, 51G, and 51B) selectively transmit red light (R), green light (G), and blue light (B). This causes the organic photoelectric conversion section 20 to detect the red light passing through the color filter 51R in the unit pixel Pr provided with the color filter 51R and generate the signal charge corresponding to the red light (R). The organic photoelectric conversion section 20 detects the green light passing through the color filter 51G in the unit pixel Pg provided with the color filter 51G and generates the signal charge corresponding to the green light (G). The organic photoelectric conversion section 20 detects the blue light passing through the color filter 51B in the unit pixel Pb provided with the color filter 51B and generates the signal charge corresponding to the blue light (B). This color filter 51 corresponds to a specific example of a "first optical film" according to the present disclosure.

Although not illustrated, there are further provided, for example, optical members such as a planarization layer and an on-chip lens above the color filter 51.

The multilayer film 10 described above is provided as a layer common to the unit pixel P (unit pixels Pr, Pg, and Pb) between the organic photoelectric conversion section 20 and the inorganic photoelectric conversion section 32. Specifically, the multilayer film 10 is provided between the organic photoelectric conversion section 20 and the interlayer insulating layer 36. The multilayer film 10 has a transmission band in the infrared light region and reflects visible light while absorbing a portion of the visible light. Of the light passing through the multilayer film 10, only light (infrared light) in the transmission band region of the multilayer film 10 therefore passes therethrough. This causes the inorganic photoelectric conversion sections 32 of the respective unit pixels Pr, Pg, and Pb to detect pieces of light having infrared light components with aligned spectra and generate the signal charge corresponding to the infrared light.

It is to be noted that it is desirable to keep the distance as short as possible between the organic photoelectric conversion section 20 and the inorganic photoelectric conversion section 32 in the imaging element 1 from the perspective of the oblique incidence characteristics.

FIGS. 6 to 8 illustrate the transmittance for each wavelength band in a case where the film thickness of each of the layers (the first semiconductor layer 11, the first dielectric layer 12, the second semiconductor layer 13, the second dielectric layer 14, and the third semiconductor layer 15) of the multilayer film 10 having the reflectance and the transmittance for each of the wavelength bands illustrated in FIG. 2 described as an example fluctuates at fluctuation rates of 10%, 5%, and 3%. As can be seen from FIGS. 6 to 8, in a case where the film thickness of each of the layers included in the multilayer film 10 fluctuates at a rate of 5% or more, it is possible to keep the transmittance of infrared light more than or equal to 80% and keep the transmittance of visible light less than 5%. It is thus preferable to use the multilayer film 10 having the following film thickness configuration in the imaging element 1.

For example, the first semiconductor layer 11 has a thickness that fluctuates at a rate of 150 nm ±5% or less represented as a standard deviation. The first dielectric layer 12 has a thickness that fluctuates at a rate of 110 nm ±5% or less represented as a standard deviation. The second semiconductor layer 13 has a thickness that fluctuates at a rate of 40 nm ±5% or less represented as a standard deviation. The second dielectric layer 14 has a thickness that fluctuates at a rate of 80 nm ±5% or less represented as a standard deviation. The third semiconductor layer 15 has a thickness that fluctuates at a rate of 30 nm ±5% or less represented as a standard deviation. The total film thickness of the first semiconductor layer 11, the first dielectric layer 12, the second semiconductor layer 13, the second dielectric layer 14, and the third semiconductor layer 15 having the thicknesses described above or the film thickness of the multilayer film 10 is, for example, a thickness that fluctuates at a rate of 410 nm±5% or less represented as a standard deviation.

The following describes a configuration of each section included in the unit pixel P in detail.

As described above, the organic photoelectric conversion section 20 detects a portion or all of the wavelengths in the visible light region. The organic photoelectric conversion section 20 has a configuration in which the lower electrode 21, the organic photoelectric conversion layer 22, and the upper electrode 23 that are disposed to be opposed to each other are stacked in this order.

In the organic photoelectric conversion section 20, light coming from the upper electrode 23 side is absorbed by the organic photoelectric conversion layer 22. The excitons (electron-hole pairs) generated by this move to the interface between an electron donor and an electron acceptor included in the organic photoelectric conversion layer 22 and undergo exciton separation. In other words, the excitons (electron-hole pairs) dissociate into electrons and holes. The electric charge (electrons and holes) generated here is transported to different electrodes by diffusion due to a carrier concentration difference and an internal electric field caused by a work function difference between the anode and the cathode. The transported electric charge is detected as a photocurrent. In addition, the application of a potential between the lower electrode 21 and the upper electrode 23 makes it possible to control the transport directions of electrons and holes.

The lower electrode 21 is for attracting the signal charge of the electric charge generated in the organic photoelectric conversion layer 22 and transferring the attracted signal charge to the electric charge holding section 33. The lower electrode 21 includes an electrically conducive film having light transmissivity. The lower electrode 21 includes, for example, ITO (indium tin oxide). However, a tin oxide ($SnO_x$)-based material to which a dopant is added or a zinc oxide-based material obtained by adding a dopant to zinc oxide (ZnO) may be used in addition to this ITO as a material included in the lower electrode 21. Examples of the zinc oxide-based material include aluminum zinc oxide (AZO) to which aluminum (Al) is added as a dopant, gallium zinc oxide (GZO) to which gallium (Ga) is added, and indium zinc oxide (IZO) to which indium (In) is added. In addition, CuI, $InSbO_4$, ZnMgO, $CuInO_2$, $MgIN_2O_4$, CdO, $ZnSnO_3$, $TiO_2$, or the like may be used as a material included in the lower electrode 21. Further, spinel oxide or oxide having a $YbFe_2O_4$ structure may be used.

The organic photoelectric conversion layer 22 converts light energy to electrical energy. The organic photoelectric conversion layer 22 is formed to include, for example, two or more types of organic materials that function as a p-type semiconductor and an n-type semiconductor. The p-type semiconductor relatively functions as an electron donor (donor) and the n-type semiconductor functions as an n-type semiconductor that relatively functions as an electron acceptor (acceptor). The organic photoelectric conversion layer 22 has a bulk heterojunction structure in the layer. The bulk heterojunction structure is a p/n junction surface that is formed by mixing the p-type semiconductor and the n-type semiconductor and excitons generated by absorbing light are separated into electrons and holes at the p/n junction interface.

The organic photoelectric conversion layer 22 may further include, in addition to the p-type semiconductor and the n-type semiconductor, three types of so-called dye materials each of which photoelectrically converts light in a predetermined wavelength band while transmitting light in another wavelength band. It is preferable that the p-type semiconductor, the n-type semiconductor, and the dye materials each have a different absorption maximum wavelength. This makes it possible to widely absorb light in the visible light region.

For example, the variety of organic semiconductor materials described above are mixed and a vacuum evaporation method is used, thereby making it possible to form the organic photoelectric conversion layer 22. In addition, for example, spin coating technology, printing technology, or the like may be used.

The upper electrode 23 includes an electrically conducive film having light transmissivity as with the lower electrode 21.

It is to be noted that there may be provided other organic layers between the organic photoelectric conversion layer 22 and the lower electrode 21 and between the organic photoelectric conversion layer 22 and the upper electrode 23.

The semiconductor substrate 30 includes, for example, an n-type silicon (Si) substrate and includes the p-well 31 in a predetermined region.

The inorganic photoelectric conversion section 32 includes, for example, a PIN (Positive Intrinsic Negative) type photodiode PD and has a pn junction in a predetermined region of the semiconductor substrate 30.

The electric charge holding section 33 includes a region (n+ region) that is provided in the semiconductor substrate 30 and has a high n-type impurity concentration.

The fixed electric charge layer 34 may be a film having positive fixed electric charge or a film having negative fixed electric charge. It is preferable that the fixed electric charge layer 34 be formed by using a semiconductor material or an electrically conductive material having a wider band gap than that of the semiconductor substrate 30. This makes it possible to suppress the generation of dark currents at the interface of the semiconductor substrate 30. Examples of a material included in the fixed electric charge layer 34 include hafnium oxide ($HfO_x$), aluminum oxide ($AlO_x$), zirconium oxide ($ZrO_x$), tantalum oxide ($TaO_x$), titanium oxide ($TiO_x$), lanthanum oxide ($LaO_x$), praseodymium oxide ($PrO_x$), cerium oxide ($CeO_x$), neodymium oxide ($NdO_x$), promethium oxide ($PmO_x$), samarium oxide ($SmO_x$), europium oxide ($EuO_x$), gadolinium oxide ($GdO_x$), terbium oxide ($TbO_x$), dysprosium oxide ($DyO_x$), holmium oxide ($HoO_x$), thulium oxide ($TmO_x$), ytterbium oxide ($YbO_x$), lutetium oxide ($LuO_x$), yttrium oxide ($YO_x$), hafnium nitride ($HfN_x$), aluminum nitride ($AlN_x$), hafnium oxynitride ($HfO_xN_y$), aluminum oxynitride ($AlO_xN_y$), and the like.

The anti-reflection layer 35 is for preventing the reflection of light caused by a refractive index difference between the semiconductor substrate 30 and the interlayer insulating layer 36. It is preferable that a material included in the anti-reflection layer 35 be a material having a refractive index between the refractive index of the semiconductor substrate 30 and the refractive index of the interlayer insulating layer 36. Examples of a material included in the anti-reflection layer 35 include tantalum oxide ($TaO_x$), silicon oxide ($SiO_x$), TEOS, silicon nitride ($SiN_x$), silicon oxynitride (SiON), and the like.

The interlayer insulating layer 36 includes, for example, a single layer film including one of silicon oxide ($SiO_x$), TEOS, silicon nitride ($SiN_x$), silicon oxynitride (SiON), or the like or a stacked film including two or more of them. The interlayer insulating layer 36 corresponds, for example, to the protective layer 17 described above.

It is possible to form the through electrode 37 by using, for example, metal materials such as aluminum (Al), tungsten (W), titanium (Ti), cobalt (Co), hafnium (Hf), and tantalum (Ta) in addition to a doped silicon material such as PDAS (Phosphorus Doped Amorphous Silicon).

FIGS. 9 and 10 illustrate examples of readout circuits of the organic photoelectric conversion section 20 (FIG. 9) and the inorganic photoelectric conversion section 32 (FIG. 10) included in the unit pixel P of the imaging element 1 illustrated in FIG. 4.

(Readout Circuit of Organic Photoelectric Conversion Section)

The readout circuit of the organic photoelectric conversion section 20 includes, for example, a floating diffusion (FD) 131, a reset transistor RST 132, an amplification transistor AMP 133, and a selection transistor SEL 134. Further, the unit pixel P is provided with a feedback amplifier FBAMP 135 for feeding back a readout signal to a reset signal for the readout circuit.

The FD 131 is coupled between the organic photoelectric conversion section 20 and the amplification transistor AMP 133. The FD 131 performs electric charge voltage conversion to convert the signal charge generated by the organic photoelectric conversion section 20 into a voltage signal and makes an output to the amplification transistor AMP 133.

The gate electrode of the amplification transistor AMP 133 is coupled to the FD 131 and the drain electrode thereof is coupled to the power supply section. The amplification transistor AMP 133 serves as an input section of a readout circuit of a voltage signal held in the FD 131. In other words, the amplification transistor AMP 133 serves as an input section of a so-called source follower circuit. In other words, the source electrode of the amplification transistor AMP 133 is coupled to the vertical signal line Lsig through the selection transistor SEL 134. This configures a constant current source and a source follower circuit. The constant current source is coupled to one end of the vertical signal line Lsig.

The selection transistor SEL 134 is coupled between the source electrode of the amplification transistor AMP 133 and the vertical signal line Lsig. A drive signal SELsig is applied to the gate electrode of the selection transistor SEL 134. In a case where this drive signal SELsig enters the active state, the selection transistor 134 enters the conduction state and the unit pixel P enters the selected state. This causes a readout signal (pixel signal) outputted from the amplification transistor AMP 133 to be outputted to the pixel drive line Lread through the selection transistor SEL 134.

The reset transistor RST 132 is coupled between the FD 131 and the power supply section. A drive signal RSTsig is applied to the gate electrode of the reset transistor RST 132. In a case where this drive signal RSTsig enters the active state, the reset gate of the reset transistor RST 132 enters the conduction state and the FD 131 is supplied with a reset signal for resetting the FD 131.

The feedback amplifier FBAMP 135 has one (−) of the input terminals coupled to the vertical signal line Lsig coupled to the selection transistor SEL 134 and has the other input terminal (+) coupled to a reference voltage section (Vref). The output terminal of the feedback amplifier FBAMP 135 is coupled between the reset transistor RST 132 and the power supply section. The feedback amplifier FBAMP 135 feeds back a readout signal (pixel signal) from each of the unit pixels P to a reset signal by the reset transistor RST 132.

Specifically, in a case where the reset transistor RST 132 resets the FD 131, the drive signal RSTsig enters the active state and the reset gate enters the conduction state. In this case, the feedback amplifier FBAMP 135 provides a necessary gain to an output signal of the selection transistor SEL 134 for feedback to cancel noise of the input section of the amplification transistor AMP 133.

(Readout Circuit of Inorganic Photoelectric Conversion Section)

The readout circuit of the inorganic photoelectric conversion section 32 includes, for example, a transfer transistor TG 141, FD 142, a reset transistor RST 143, an amplification transistor AMP 144, and a selection transistor SEL 145.

The transfer transistor TG 141 is coupled between the inorganic photoelectric conversion section 32 and the FD 142. A drive signal TGsig is applied to the gate electrode of the transfer transistor TG 141. In a case where this drive signal TGsig enters the active state, the transfer gate of the transfer transistor TG 141 enters the conduction state and the signal charge accumulated in the inorganic photoelectric conversion section 32 is transferred to the FD 142 through the transfer transistor TG 141.

The FD 142 is coupled between the transfer transistor TG 141 and the amplification transistor AMP 144. The FD 142 performs electric charge voltage conversion to convert the signal charge transferred by the transfer transistor TG 141 into a voltage signal and makes an output to the amplification transistor AMP 144.

A reset transistor RST 133 is coupled between the FD 142 and the power supply section. The drive signal RSTsig is applied to the gate electrode of the reset transistor RST 133. In a case where this drive signal RSTsig enters the active state, the reset gate of the reset transistor RST 133 enters the conduction state and the potential of the FD 142 is reset to the level of the power supply section.

The gate electrode of the amplification transistor AMP 144 is coupled to the FD 142 and the drain electrode thereof is coupled to the power supply section. The amplification transistor AMP 144 serves as an input section of a readout circuit of a voltage signal held in the FD 142. In other words, the amplification transistor AMP 144 serves as an input section of a so-called source follower circuit. In other words, the source electrode of the amplification transistor AMP 144 is coupled to the vertical signal line Lsig through the selection transistor SEL 135. This configures a constant current source and a source follower circuit. The constant current source is coupled to one end of the vertical signal line Lsig.

The selection transistor SEL 135 is coupled between the source electrode of the amplification transistor AMP 144 and the vertical signal line Lsig. The drive signal SELsig is applied to the gate electrode of the selection transistor SEL 135. In a case where this drive signal SELsig enters the active state, the selection transistor SEL 135 enters the conduction state and the unit pixel P enters the selected state.

This causes a readout signal (pixel signal) outputted from the amplification transistor AMP 144 to be outputted to the vertical signal line Lsig through the selection transistor SEL 135.

1-3. Workings and Effects

In the multilayer film 10 according to the present embodiment, semiconductor layers and dielectric layers are alternately stacked to offer an optical distance of 0.3 μm or more and 10 μm or less in the stack direction. In each of the semiconductor layers, for example, the value of the optical constant k1 for visible light among the optical constants k is larger than the value of the optical constant k2 for infrared light. Each of the optical constants k serves as an extinction coefficient that is the imaginary part of a complex refractive index. This makes it possible to absorb a portion of visible light while selectively transmitting infrared light. The following describes this.

As described above, an image sensor that is allowed to concurrently obtain both a visible light image and an IR image is provided with a multilayer film filter between an organic photoelectric conversion film and a semiconductor layer to generate an IR image having high resolution. A photodiode is formed to be buried in the semiconductor layer. The multilayer film filter has a transmission band in the infrared light region.

However, in a typical multilayer film filter, high refractive index material layers each including a dielectric (insulator) such as silicon nitride ($SiN_x$) or titanium oxide ($TiO_x$) and low refractive index material layers each including a dielectric (insulator) such as silicon oxide ($SiO_x$) are alternately stacked. It is difficult in the multilayer film filter having such a configuration to secure a refractive index difference between the high refractive index material layers and the low refractive index material layers. This facilitates the multilayer film filter to be thicker, raising an issue about the deterioration of the oblique incidence characteristics.

In addition, a typical multilayer film filter has the transmissivity of visible light increased by increasing reflection. In a case where the multilayer film filter is used for an image sensor, color mixture and flare may therefore occur respectively because the visible light reflected by the multilayer film filter enters an organic photoelectric conversion film again and the reflected visible light exits from the upper portion of the sensor.

In contrast, in the multilayer film 10 according to the present embodiment, semiconductor layers (the first semiconductor layer 11, the second semiconductor layer 13, and the third semiconductor layer 15) and dielectric layers (the first dielectric layer 12 and the second dielectric layer 14) are alternately stacked and the optical distance in the stack direction is set to be 0.3 μm or more and 10 μm or less. In each of the semiconductor layers (the first semiconductor layer 11, the second semiconductor layer 13, and the third semiconductor layer 15), the value of the optical constant k1 for visible light among the optical constants k is larger than the value of the optical constant k2 for infrared light. Each of the optical constants k serves as an extinction coefficient that is the imaginary part of a complex refractive index. This makes it possible to secure a larger refractive index difference from a dielectric layer than that of a typical multilayer film filter and reduce the total film thickness of a multilayer film having desired transmission characteristics. In addition, amorphous materials (e.g., amorphous silicon) included in the semiconductor layers (the first semiconductor layer 11, the second semiconductor layer 13, and the third semiconductor layer 15) each have absorption characteristics for visible light. This makes it possible to absorb at least a portion of the visible light passing through the organic photoelectric conversion section 20.

As described above, in the imaging element 1 in which the multilayer film 10 according to the present embodiment, the occurrence of color mixture caused by the visible light reflected by the multilayer film 10 entering the organic photoelectric conversion section 20 again is reduced. In addition, the occurrence of flare caused by the visible light reflected by the multilayer film 10 exiting to the light incidence side S1 is reduced. It is thus possible to increase the image quality in imaging.

Further, it is possible in the imaging element 1 in which the multilayer film 10 according to the present embodiment is used to reduce the distance between the inorganic photoelectric conversion section 32 and the organic photoelectric conversion section 20. This reduces the absorption of infrared light by the through electrode 37 that extends between the organic photoelectric conversion section 20 and the inorganic photoelectric conversion section 32. This increases the photoelectric conversion efficiency of the inorganic photoelectric conversion section 32 and makes it possible to increase the sensitivity to infrared light.

Next, a modification example of the present disclosure is described. The following assigns the same signs to components similar to those of the embodiment described above and omits descriptions thereof as appropriate.

2. MODIFICATION EXAMPLE

FIG. 11 illustrates an example of a cross-sectional configuration of an imaging element (imaging element 2) according to a modification example of the present disclosure. The imaging element 1 described in the embodiment described above may be further provided with a dual bandpass filter 61 on the light incidence side 51.

The dual bandpass filter 61 is disposed on the light incidence side 51 as described above. For example, the dual bandpass filter 61 is disposed in the upper portion of the imaging element 2. The dual bandpass filter 61 has respective transmission bands in the visible light region and the infrared light region. The dual bandpass filter 61 corresponds to a specific example of a "second optical film" according to the present disclosure.

FIG. 12 illustrates the reflectance and the transmittance for each wavelength band in a case where the dual bandpass filter 61 is disposed above the multilayer film 10 described above. As can been seen from FIG. 12, light that enters the multilayer film 10 and has a wavelength of 700 to 880 nm is cut by combining the multilayer film 10 and the dual bandpass filter 61. In other words, the noise components in the SNR of the inorganic photoelectric conversion section 32 are decreased. Therefore, in the imaging element 2 according to the present embodiment, it is possible to obtain an infrared light (IR) image having higher resolution in addition to the effects according to the embodiment described above.

In addition, the spectrum obliquely incident on the multilayer film 10 typically shifts to the short wavelength side as illustrated in FIG. 2. In contrast, the multilayer film 10 according to the present disclosure is designed to have the inflection point of the wavelength-dependent transmittance characteristics outside the transmission band region (attenuation region). Even in a case where the dual bandpass filter 61 is used as in the imaging element 2 according to the present embodiment, a shift onto the short wavelength side caused by oblique incidence is therefore less likely to decrease the transmission amount of light having infrared light components. In other words, the multilayer film 10 according to the present disclosure reduces a decrease in the signal components in the SNR of the inorganic photoelectric conversion section 32 and makes it possible to prevent the deterioration of the image quality.

3. APPLICATION EXAMPLE

Each of the imaging elements 1 and 2 described above is applicable to any type of electronic apparatus having an imaging function, for example, a camera system such as a digital still camera and a video camera, a mobile phone having an imaging function, and the like. FIG. 13 illustrates a schematic configuration of an electronic apparatus 1000.

The electronic apparatus 1000 includes, for example, the imaging element 1, a DSP (Digital Signal Processor) circuit 1001, a frame memory 1002, a display section 1003, a recording section 1004, an operation section 1005, and a power supply section 1006. They are coupled to each other through a bus line 1007.

The DSP circuit 1001 is a signal processing circuit that processes a signal supplied from the imaging element 1. The DSP circuit 1001 outputs image data that is obtained by processing the signal from the imaging element 1. The frame memory 1002 temporarily retains the image data processed by the DSP circuit 1001 in units of frames.

The display section 1003 includes, for example, a panel-type display device such as a liquid crystal panel or an organic EL (Electro Luminescence) panel and records the image data of a moving image or a still image captured by the imaging element 1 in a recording medium such as a semiconductor memory or a hard disk.

The operation section 1005 outputs an operation signal for a variety of functions of the electronic apparatus 1000 in accordance with an operation by a user. The power supply section 1006 appropriately supplies the DSP circuit 1001, the frame memory 1002, the display section 1003, the recording section 1004, and the operation section 1005 with various kinds of power for operations of these supply targets.

4. PRACTICAL APPLICATION EXAMPLES (Example of Practical Application to Endoscopic Surgery System)

The technology (the present technology) according to the present disclosure is applicable to a variety of products. For example, the technology according to the present disclosure may be applied to an endoscopic surgery system.

FIG. 14 is a view depicting an example of a schematic configuration of an endoscopic surgery system to which the technology according to an embodiment of the present disclosure (present technology) can be applied.

In FIG. 14, a state is illustrated in which a surgeon (medical doctor) 11131 is using an endoscopic surgery system 11000 to perform surgery for a patient 11132 on a patient bed 11133. As depicted, the endoscopic surgery system 11000 includes an endoscope 11100, other surgical tools 11110 such as a pneumoperitoneum tube 11111 and an energy device 11112, a supporting arm apparatus 11120 which supports the endoscope 11100 thereon, and a cart 11200 on which various apparatus for endoscopic surgery are mounted.

The endoscope 11100 includes a lens barrel 11101 having a region of a predetermined length from a distal end thereof to be inserted into a body cavity of the patient 11132, and a camera head 11102 connected to a proximal end of the lens barrel 11101. In the example depicted, the endoscope 11100 is depicted which includes as a rigid endoscope having the lens barrel 11101 of the hard type. However, the endoscope 11100 may otherwise be included as a flexible endoscope having the lens barrel 11101 of the flexible type.

The lens barrel 11101 has, at a distal end thereof, an opening in which an objective lens is fitted. A light source apparatus 11203 is connected to the endoscope 11100 such that light generated by the light source apparatus 11203 is introduced to a distal end of the lens barrel 11101 by a light guide extending in the inside of the lens barrel 11101 and is irradiated toward an observation target in a body cavity of the patient 11132 through the objective lens. It is to be noted that the endoscope 11100 may be a forward-viewing endoscope or may be an oblique-viewing endoscope or a side-viewing endoscope.

An optical system and an image pickup element are provided in the inside of the camera head 11102 such that reflected light (observation light) from the observation target is condensed on the image pickup element by the optical system. The observation light is photoelectrically converted by the image pickup element to generate an electric signal corresponding to the observation light, namely, an image signal corresponding to an observation image. The image signal is transmitted as RAW data to a CCU 11201.

The CCU 11201 includes a central processing unit (CPU), a graphics processing unit (GPU) or the like and integrally controls operation of the endoscope 11100 and a display apparatus 11202. Further, the CCU 11201 receives an image signal from the camera head 11102 and performs, for the image signal, various image processes for displaying an image based on the image signal such as, for example, a development process (demosaic process).

The display apparatus 11202 displays thereon an image based on an image signal, for which the image processes have been performed by the CCU 11201, under the control of the CCU 11201.

The light source apparatus 11203 includes a light source such as, for example, a light emitting diode (LED) and supplies irradiation light upon imaging of a surgical region to the endoscope 11100.

An inputting apparatus 11204 is an input interface for the endoscopic surgery system 11000. A user can perform inputting of various kinds of information or instruction inputting to the endoscopic surgery system 11000 through the inputting apparatus 11204. For example, the user would input an instruction or a like to change an image pickup condition (type of irradiation light, magnification, focal distance or the like) by the endoscope 11100.

A treatment tool controlling apparatus 11205 controls driving of the energy device 11112 for cautery or incision of a tissue, sealing of a blood vessel or the like. A pneumoperitoneum apparatus 11206 feeds gas into a body cavity of the patient 11132 through the pneumoperitoneum tube 11111 to inflate the body cavity in order to secure the field of view of the endoscope 11100 and secure the working space for the surgeon. A recorder 11207 is an apparatus capable of recording various kinds of information relating to surgery. A printer 11208 is an apparatus capable of printing various kinds of information relating to surgery in various forms such as a text, an image or a graph.

It is to be noted that the light source apparatus 11203 which supplies irradiation light when a surgical region is to be imaged to the endoscope 11100 may include a white light source which includes, for example, an LED, a laser light source or a combination of them. Where a white light source includes a combination of red, green, and blue (RGB) laser light sources, since the output intensity and the output timing can be controlled with a high degree of accuracy for each color (each wavelength), adjustment of the white balance of a picked up image can be performed by the light source apparatus 11203. Further, in this case, if laser beams from the respective RGB laser light sources are irradiated time-divisionally on an observation target and driving of the image pickup elements of the camera head 11102 are controlled in synchronism with the irradiation timings. Then images individually corresponding to the R, G and B colors can be also picked up time-divisionally. According to this method, a color image can be obtained even if color filters are not provided for the image pickup element.

Further, the light source apparatus 11203 may be controlled such that the intensity of light to be outputted is changed for each predetermined time. By controlling driving of the image pickup element of the camera head 11102 in synchronism with the timing of the change of the intensity of light to acquire images time-divisionally and synthesizing the images, an image of a high dynamic range free from underexposed blocked up shadows and overexposed highlights can be created.

Further, the light source apparatus 11203 may be configured to supply light of a predetermined wavelength band ready for special light observation. In special light observation, for example, by utilizing the wavelength dependency of absorption of light in a body tissue to irradiate light of a narrow band in comparison with irradiation light upon ordinary observation (namely, white light), narrow band observation (narrow band imaging) of imaging a predetermined tissue such as a blood vessel of a superficial portion of the mucous membrane or the like in a high contrast is performed. Alternatively, in special light observation, fluorescent observation for obtaining an image from fluorescent light generated by irradiation of excitation light may be performed. In fluorescent observation, it is possible to perform observation of fluorescent light from a body tissue by irradiating excitation light on the body tissue (autofluorescence observation) or to obtain a fluorescent light image by locally injecting a reagent such as indocyanine green (ICG) into a body tissue and irradiating excitation light corresponding to a fluorescent light wavelength of the reagent upon the body tissue. The light source apparatus 11203 can be configured to supply such narrow-band light and/or excitation light suitable for special light observation as described above.

FIG. 15 is a block diagram depicting an example of a functional configuration of the camera head 11102 and the CCU 11201 depicted in FIG. 14.

The camera head 11102 includes a lens unit 11401, an image pickup unit 11402, a driving unit 11403, a communication unit 11404 and a camera head controlling unit 11405. The CCU 11201 includes a communication unit 11411, an image processing unit 11412 and a control unit 11413. The camera head 11102 and the CCU 11201 are connected for communication to each other by a transmission cable 11400.

The lens unit 11401 is an optical system, provided at a connecting location to the lens barrel 11101. Observation light taken in from a distal end of the lens barrel 11101 is guided to the camera head 11102 and introduced into the lens unit 11401. The lens unit 11401 includes a combination of a plurality of lenses including a zoom lens and a focusing lens.

The number of image pickup elements which is included by the image pickup unit 11402 may be one (single-plate type) or a plural number (multi-plate type). Where the image pickup unit 11402 is configured as that of the multi-plate type, for example, image signals corresponding to respective R, G and B are generated by the image pickup elements, and the image signals may be synthesized to obtain a color image. The image pickup unit 11402 may also be configured so as to have a pair of image pickup elements for acquiring respective image signals for the right eye and the left eye ready for three dimensional (3D) display. If 3D display is performed, then the depth of a living body tissue in a surgical region can be comprehended more accurately by the surgeon 11131. It is to be noted that, where the image pickup unit 11402 is configured as that of stereoscopic type, a plurality of systems of lens units 11401 are provided corresponding to the individual image pickup elements.

Further, the image pickup unit 11402 may not necessarily be provided on the camera head 11102. For example, the image pickup unit 11402 may be provided immediately behind the objective lens in the inside of the lens barrel 11101.

The driving unit 11403 includes an actuator and moves the zoom lens and the focusing lens of the lens unit 11401 by a predetermined distance along an optical axis under the control of the camera head controlling unit 11405. Consequently, the magnification and the focal point of a picked up image by the image pickup unit 11402 can be adjusted suitably.

The communication unit 11404 includes a communication apparatus for transmitting and receiving various kinds of information to and from the CCU 11201. The communication unit 11404 transmits an image signal acquired from the image pickup unit 11402 as RAW data to the CCU 11201 through the transmission cable 11400.

In addition, the communication unit 11404 receives a control signal for controlling driving of the camera head 11102 from the CCU 11201 and supplies the control signal to the camera head controlling unit 11405. The control signal includes information relating to image pickup conditions such as, for example, information that a frame rate of a picked up image is designated, information that an exposure value upon image picking up is designated and/or information that a magnification and a focal point of a picked up image are designated.

It is to be noted that the image pickup conditions such as the frame rate, exposure value, magnification or focal point may be designated by the user or may be set automatically by the control unit 11413 of the CCU 11201 on the basis of an acquired image signal. In the latter case, an auto exposure (AE) function, an auto focus (AF) function and an auto white balance (AWB) function are incorporated in the endoscope 11100.

The camera head controlling unit 11405 controls driving of the camera head 11102 on the basis of a control signal from the CCU 11201 received through the communication unit 11404.

The communication unit 11411 includes a communication apparatus for transmitting and receiving various kinds of information to and from the camera head 11102. The communication unit 11411 receives an image signal transmitted thereto from the camera head 11102 through the transmission cable 11400.

Further, the communication unit 11411 transmits a control signal for controlling driving of the camera head 11102 to the camera head 11102. The image signal and the control signal can be transmitted by electrical communication, optical communication or the like.

The image processing unit 11412 performs various image processes for an image signal in the form of RAW data transmitted thereto from the camera head 11102.

The control unit 11413 performs various kinds of control relating to image picking up of a surgical region or the like by the endoscope 11100 and display of a picked up image obtained by image picking up of the surgical region or the like. For example, the control unit 11413 creates a control signal for controlling driving of the camera head 11102.

Further, the control unit 11413 controls, on the basis of an image signal for which image processes have been performed by the image processing unit 11412, the display apparatus 11202 to display a picked up image in which the surgical region or the like is imaged. Thereupon, the control unit 11413 may recognize various objects in the picked up image using various image recognition technologies. For example, the control unit 11413 can recognize a surgical tool such as forceps, a particular living body region, bleeding, mist when the energy device 11112 is used and so forth by detecting the shape, color and so forth of edges of objects included in a picked up image. The control unit 11413 may cause, when it controls the display apparatus 11202 to display a picked up image, various kinds of surgery supporting information to be displayed in an overlapping manner with an image of the surgical region using a result of the recognition. Where surgery supporting information is displayed in an overlapping manner and presented to the surgeon 11131, the burden on the surgeon 11131 can be reduced and the surgeon 11131 can proceed with the surgery with certainty.

The transmission cable 11400 which connects the camera head 11102 and the CCU 11201 to each other is an electric signal cable ready for communication of an electric signal, an optical fiber ready for optical communication or a composite cable ready for both of electrical and optical communications.

Here, while, in the example depicted, communication is performed by wired communication using the transmission cable 11400, the communication between the camera head 11102 and the CCU 11201 may be performed by wireless communication.

The example of the endoscopic surgery system to which the technology according to the present disclosure may be applied has been described above. The technology according to the present disclosure may be applied to the image pickup unit 11402 among the components described above. The application of the technology according to the present disclosure to the image pickup unit 11402 increases the detection accuracy.

It is to be noted that the endoscopic surgery system has been described here as an example, but the technology according to the present disclosure may be additionally applied, for example, to a microscopic surgery system or the like.

Example of Practical Application to Mobile Body

The technology according to the present disclosure is applicable to a variety of products. For example, the technology according to the present disclosure may be achieved as a device mounted on any type of mobile body such as a vehicle, an electric vehicle, a hybrid electric vehicle, a motorcycle, a bicycle, a personal mobility, an airplane, a drone, a vessel, a robot, a construction machine, or an agricultural machine (tractor).

FIG. 16 is a block diagram depicting an example of schematic configuration of a vehicle control system as an example of a mobile body control system to which the technology according to an embodiment of the present disclosure can be applied.

The vehicle control system 12000 includes a plurality of electronic control units connected to each other via a communication network 12001. In the example depicted in FIG. 16, the vehicle control system 12000 includes a driving system control unit 12010, a body system control unit 12020, an outside-vehicle information detecting unit 12030, an in-vehicle information detecting unit 12040, and an integrated control unit 12050. In addition, a microcomputer 12051, a sound/image output section 12052, and a vehicle-mounted network interface (I/F) 12053 are illustrated as a functional configuration of the integrated control unit 12050.

The driving system control unit 12010 controls the operation of devices related to the driving system of the vehicle in accordance with various kinds of programs. For example, the driving system control unit 12010 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like.

The body system control unit 12020 controls the operation of various kinds of devices provided to a vehicle body in accordance with various kinds of programs. For example, the body system control unit 12020 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 12020. The body system control unit 12020 receives these input radio waves or signals, and controls a door lock device, the power window device, the lamps, or the like of the vehicle.

The outside-vehicle information detecting unit 12030 detects information about the outside of the vehicle including the vehicle control system 12000. For example, the outside-vehicle information detecting unit 12030 is connected with an imaging section 12031. The outside-vehicle information detecting unit 12030 makes the imaging section 12031 image an image of the outside of the vehicle, and receives the imaged image. On the basis of the received image, the outside-vehicle information detecting unit 12030 may perform processing of detecting an object such as a human, a vehicle, an obstacle, a sign, a character on a road surface, or the like, or processing of detecting a distance thereto.

The imaging section 12031 is an optical sensor that receives light, and which outputs an electric signal corresponding to a received light amount of the light. The imaging section 12031 can output the electric signal as an image, or can output the electric signal as information about a measured distance. In addition, the light received by the imaging section 12031 may be visible light, or may be invisible light such as infrared rays or the like.

The in-vehicle information detecting unit 12040 detects information about the inside of the vehicle. The in-vehicle information detecting unit 12040 is, for example, connected with a driver state detecting section 12041 that detects the state of a driver. The driver state detecting section 12041, for example, includes a camera that images the driver. On the basis of detection information input from the driver state detecting section 12041, the in-vehicle information detecting unit 12040 may calculate a degree of fatigue of the driver or a degree of concentration of the driver, or may determine whether the driver is dozing.

The microcomputer 12051 can calculate a control target value for the driving force generating device, the steering mechanism, or the braking device on the basis of the information about the inside or outside of the vehicle which information is obtained by the outside-vehicle information detecting unit 12030 or the in-vehicle information detecting unit 12040, and output a control command to the driving system control unit 12010. For example, the microcomputer 12051 can perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like.

In addition, the microcomputer 12051 can perform cooperative control intended for automatic driving, which makes the vehicle to travel autonomously without depending on the operation of the driver, or the like, by controlling the driving force generating device, the steering mechanism, the braking device, or the like on the basis of the information about the outside or inside of the vehicle which information is obtained by the outside-vehicle information detecting unit 12030 or the in-vehicle information detecting unit 12040.

In addition, the microcomputer 12051 can output a control command to the body system control unit 12020 on the basis of the information about the outside of the vehicle which information is obtained by the outside-vehicle information detecting unit 12030. For example, the microcomputer 12051 can perform cooperative control intended to prevent a glare by controlling the headlamp so as to change from a high beam to a low beam, for example, in accordance with the position of a preceding vehicle or an oncoming vehicle detected by the outside-vehicle information detecting unit 12030.

The sound/image output section 12052 transmits an output signal of at least one of a sound and an image to an output device capable of visually or auditorily notifying information to an occupant of the vehicle or the outside of the vehicle. In the example of FIG. 16, an audio speaker 12061, a display section 12062, and an instrument panel 12063 are illustrated as the output device. The display section 12062 may, for example, include at least one of an on-board display and a head-up display.

FIG. 17 is a diagram depicting an example of the installation position of the imaging section 12031.

In FIG. 17, the imaging section 12031 includes imaging sections 12101, 12102, 12103, 12104, and 12105.

The imaging sections 12101, 12102, 12103, 12104, and 12105 are, for example, disposed at positions on a front nose, sideview mirrors, a rear bumper, and a back door of the vehicle 12100 as well as a position on an upper portion of a windshield within the interior of the vehicle. The imaging section 12101 provided to the front nose and the imaging section 12105 provided to the upper portion of the windshield within the interior of the vehicle obtain mainly an image of the front of the vehicle 12100. The imaging sections 12102 and 12103 provided to the sideview mirrors obtain mainly an image of the sides of the vehicle 12100. The imaging section 12104 provided to the rear bumper or the back door obtains mainly an image of the rear of the vehicle 12100. The imaging section 12105 provided to the upper portion of the windshield within the interior of the vehicle is used mainly to detect a preceding vehicle, a pedestrian, an obstacle, a signal, a traffic sign, a lane, or the like.

Incidentally, FIG. 17 depicts an example of photographing ranges of the imaging sections 12101 to 12104. An imaging range 12111 represents the imaging range of the imaging section 12101 provided to the front nose. Imaging ranges 12112 and 12113 respectively represent the imaging ranges of the imaging sections 12102 and 12103 provided to the sideview mirrors. An imaging range 12114 represents the imaging range of the imaging section 12104 provided to the rear bumper or the back door. A bird's-eye image of the vehicle 12100 as viewed from above is obtained by superimposing image data imaged by the imaging sections 12101 to 12104, for example.

At least one of the imaging sections 12101 to 12104 may have a function of obtaining distance information. For example, at least one of the imaging sections 12101 to 12104 may be a stereo camera constituted of a plurality of imaging elements, or may be an imaging element having pixels for phase difference detection.

For example, the microcomputer 12051 can determine a distance to each three-dimensional object within the imaging ranges 12111 to 12114 and a temporal change in the distance (relative speed with respect to the vehicle 12100) on the basis of the distance information obtained from the imaging sections 12101 to 12104, and thereby extract, as a preceding vehicle, a nearest three-dimensional object in particular that is present on a traveling path of the vehicle 12100 and which travels in substantially the same direction as the vehicle 12100 at a predetermined speed (for example, equal to or more than 0 km/hour). Further, the microcomputer 12051 can set a following distance to be maintained in front of a preceding vehicle in advance, and perform automatic brake control (including following stop control), automatic acceleration control (including following start control), or the like. It is thus possible to perform cooperative control intended for automatic driving that makes the vehicle travel autonomously without depending on the operation of the driver or the like.

For example, the microcomputer 12051 can classify three-dimensional object data on three-dimensional objects into three-dimensional object data of a two-wheeled vehicle, a standard-sized vehicle, a large-sized vehicle, a pedestrian, a utility pole, and other three-dimensional objects on the basis of the distance information obtained from the imaging sections 12101 to 12104, extract the classified three-dimensional object data, and use the extracted three-dimensional object data for automatic avoidance of an obstacle. For example, the microcomputer 12051 identifies obstacles around the vehicle 12100 as obstacles that the driver of the vehicle 12100 can recognize visually and obstacles that are difficult for the driver of the vehicle 12100 to recognize visually. Then, the microcomputer 12051 determines a collision risk indicating a risk of collision with each obstacle. In a situation in which the collision risk is equal to or higher than a set value and there is thus a possibility of collision, the microcomputer 12051 outputs a warning to the driver via the audio speaker 12061 or the display section 12062, and performs forced deceleration or avoidance steering via the driving system control unit 12010. The microcomputer 12051 can thereby assist in driving to avoid collision.

At least one of the imaging sections 12101 to 12104 may be an infrared camera that detects infrared rays. The microcomputer 12051 can, for example, recognize a pedestrian by determining whether or not there is a pedestrian in imaged images of the imaging sections 12101 to 12104. Such recognition of a pedestrian is, for example, performed by a procedure of extracting characteristic points in the imaged images of the imaging sections 12101 to 12104 as infrared cameras and a procedure of determining whether or not it is the pedestrian by performing pattern matching processing on a series of characteristic points representing the contour of the object. When the microcomputer 12051 determines that there is a pedestrian in the imaged images of the imaging sections 12101 to 12104, and thus recognizes the pedestrian, the sound/image output section 12052 controls the display section 12062 so that a square contour line for emphasis is displayed so as to be superimposed on the recognized pedestrian. The sound/image output section 12052 may also control the display section 12062 so that an icon or the like representing the pedestrian is displayed at a desired position.

Although the description has been given with reference to the embodiment, the modification example, and the application example and the practical application examples, the contents of the present disclosure are not limited to the embodiment and the like described above. The present disclosure may be modified in a variety of ways. For example, the components, disposition, numbers, and the like of each of the imaging elements 1 and 2 exemplified in the embodiment and the like described above are merely examples. Not all of the components have to be provided. In addition, other components may be further included.

In addition, in the embodiment or the like described above, the example has been described in which the lower electrodes 21 are separately formed for the respective unit pixels Pr, Pg, and Pb and the organic photoelectric conversion layer 22 and the upper electrode 23 are provided as continuous layers common to the respective unit pixels Pr, Pg, and Pb. The organic photoelectric conversion layers 22 and the upper electrodes 23 may be, however, formed separately for the respective unit pixels Pr, Pg, and Pb as with the lower electrodes 21. Further, in the embodiment and the like described above, the example has been described in which the lower electrode 21 includes one electrode, but two or three or more electrodes may be used.

Furthermore, the present technology has been described in the embodiment and the like described above with reference to a so-called back-illuminated image sensor as an example in which the front (second surface 30B) side of the semiconductor substrate 30 is provided with the multilayer wiring layer 40 and light comes from the back surface (first surface 30A) side, but the present technology is also applicable to a front-illuminated image sensor.

It is to be noted that the effects described herein are merely examples, but are not limitative. In addition, there may be other effects.

It is to be noted that the present disclosure may also have configurations as follows. According to the present technology having the following configurations, there is provided a multilayer film that has the semiconductor layers and the dielectric layers alternately stacked therein and has an optical distance of 0.3 µm or more and 10 µm or less in the stack direction. In each of the semiconductor layers, the value of the optical constant k1 for the light having the wavelength in the visible light region among the optical constants k is larger than the value of the optical constant k2 for the light having the wavelength in the infrared light region. Each of the optical constants k serves as an extinction coefficient that is the imaginary part of a complex refractive index. This multilayer film is disposed between the first photoelectric conversion section and the second photoelectric conversion section. The first photoelectric conversion section has sensitivity to the light having the wavelength in the infrared light region. The second photoelectric conversion section has sensitivity to the light having the wavelength in the visible light region. This causes the multilayer film to absorb at least a portion of visible light while selectively transmitting infrared light. The imaging element including this multilayer film is allowed to have higher image quality in imaging.

(1)

A multilayer film including:
semiconductor layers in each of which a value of an optical constant k1 for light having a wavelength in a visible light region among optical constants k is larger than a value of an optical constant k2 for light having a wavelength in an infrared light region, the optical constants k each serving as an extinction coefficient that includes an imaginary part of a complex refractive index; and
dielectric layers, in which
the semiconductor layers and the dielectric layers are alternately stacked and the multilayer film has an optical distance of 0.3 µm or more and 10 µm or less in a stack direction and absorbs at least a portion of visible light and transmits infrared light.

(2)

The multilayer film according to (1), including:
a first semiconductor layer, a second semiconductor layer, and a third semiconductor layer as the semiconductor layers; and
a first dielectric layer and a second dielectric layer as the dielectric layers, in which
the first semiconductor layer, the first dielectric layer, the second semiconductor layer, the second dielectric layer, and the third semiconductor layer are stacked in this order from a light incidence surface side.

(3)

The multilayer film according to (1) or (2), in which each of the semiconductor layers includes any of silicon, germanium, or silicon germanium or an amorphous material thereof.

(4)

The multilayer film according to any one of (1) to (3), in which each of the dielectric layers includes any of silicon oxide, silicon nitride, silicon oxynitride, silicon carbide, aluminum oxide, or magnesium fluoride.

(5)

The multilayer film according to any one of (2) to (4), further including a first protective layer in an upper layer of the first semiconductor layer, the first protective layer including silicon oxide.

(6)

The multilayer film according to any one of (2) to (5), further including a second protective layer in a lower layer of the third semiconductor layer, the second protective layer including silicon oxide.

(7)

An imaging element including:
a first photoelectric conversion section having sensitivity to light having a wavelength in an infrared light region;
a second photoelectric conversion section that is stacked on a light incidence surface side of the first photoelectric conversion section, the second photoelectric conversion section having sensitivity to light having a wavelength in a visible light region; and a multilayer film that is provided between the first photoelectric conversion section and the second photoelectric conversion section,
the multilayer film including
semiconductor layers in each of which a value of an optical constant k1 for light having a wavelength in a visible light region among optical constants k is larger than a value of an optical constant k2 for light having a wavelength in an infrared light region, the optical constants k each serving as an extinction coefficient that includes an imaginary part of a complex refractive index, and
dielectric layers, in which
the semiconductor layers and the dielectric layers are alternately stacked and the multilayer film has an optical distance of 0.3 µm or more and 10 µm or less in a stack direction and absorbs at least a portion of visible light and transmits infrared light.

(8)
The imaging element according to (7), including:
a first semiconductor layer, a second semiconductor layer, and a third semiconductor layer as the semiconductor layers; and
a first dielectric layer and a second dielectric layer as the dielectric layers, in which
the first semiconductor layer, the first dielectric layer, the second semiconductor layer, the second dielectric layer, and the third semiconductor layer are stacked in this order from a light incidence surface side.

(9)
The imaging element according to (7) or (8), in which each of the semiconductor layers includes any of silicon, germanium, or silicon germanium or an amorphous material thereof.

(10)
The imaging element according to any one of (7) to (9), in which each of the dielectric layers includes any of silicon oxide, silicon nitride, silicon oxynitride, silicon carbide, aluminum oxide, or magnesium fluoride.

(11)
The imaging element according to any one of (7) to (10), further including a fixed electric charge layer and an anti-reflection layer between the first photoelectric conversion section and the multilayer film, the fixed electric charge layer and the anti-reflection layer being stacked in order from the first photoelectric conversion section side.

(12)
The imaging element according to any one of (7) to (11), further including a first optical film on the light incidence surface side of the second photoelectric conversion section, the first optical film transmitting light in a predetermined wavelength band corresponding to a color component.

(13)
The imaging element according to (12), further including a second optical film closer to the light incidence surface side than the first optical film, the second optical film selectively transmitting the light having the wavelength in the visible light region and the light having the wavelength in the infrared light region.

(14)
The imaging element according to any one of (1) to (13), further including a semiconductor substrate having one surface and another opposed surface, in which
the first photoelectric conversion section is formed to be buried in the semiconductor substrate, and
the second photoelectric conversion section is disposed on the one surface side of the semiconductor substrate.

(15)
The imaging element according to (14), in which the semiconductor substrate further includes a through electrode that extends between the one surface and the other surface of the semiconductor substrate and a readout circuit that is provided on the other surface side, the readout circuit outputting a signal based on electric charge outputted from the second photoelectric conversion section through the through electrode.

This application claims the priority on the basis of Japanese Patent Application No. 2020-029253 filed with Japan Patent Office on Feb. 25, 2020, the entire contents of which are incorporated in this application by reference.

It should be understood by those skilled in the art that various modifications, combinations, sub-combinations, and alterations may occur depending on design requirements and other factors insofar as they are within the scope of the appended claims or the equivalents thereof.

The invention claimed is:
1. A multilayer film, comprising:
a plurality of semiconductor layers, wherein
in each semiconductor layer of the plurality of semiconductor layers, a value of a first optical constant k1 for a visible light having a wavelength in a visible light region is larger than a value of a second optical constant k2 for an infrared light having a wavelength in an infrared light region,
optical constants k each serves as an extinction coefficient that includes an imaginary part of a complex refractive index, and
the optical constants k include the first optical constant k1 and the second optical constant k2; and
a plurality of dielectric layers, wherein
the plurality of semiconductor layers and the plurality of dielectric layers are alternately stacked,
the multilayer film has an optical distance of 0.3 µm or more and 10 µm or less in a stack direction, and
the multilayer film is configured to absorb at least a portion of the visible light and transmit the infrared light.

2. The multilayer film according to claim 1, wherein the plurality of semiconductor layers comprises:
a first semiconductor layer;
a second semiconductor layer; and
a third semiconductor layer, and
the plurality of dielectric layers comprises:
a first dielectric layer; and
a second dielectric layer, wherein
the first semiconductor layer, the first dielectric layer, the second semiconductor layer, the second dielectric layer, and the third semiconductor layer are stacked in this order from a side of a light incidence surface of the multilayer film.

3. The multilayer film according to claim 1, wherein the each semiconductor layer of the plurality of semiconductor layers includes one of silicon, germanium, or silicon germanium or an amorphous material thereof.

4. The multilayer film according to claim 1, wherein each dielectric layer of the plurality of dielectric layers includes one of silicon oxide, silicon nitride, silicon oxynitride, silicon carbide, aluminum oxide, or magnesium fluoride.

5. The multilayer film according to claim 2, further comprising
a first protective layer in an upper layer of the first semiconductor layer, wherein
the first protective layer includes silicon oxide.

6. The multilayer film according to claim 2, further comprising
a second protective layer in a lower layer of the third semiconductor layer, wherein
the second protective layer includes silicon oxide.

7. An imaging element, comprising:
a first photoelectric conversion section having sensitivity to an infrared light having a wavelength in an infrared light region;
a second photoelectric conversion section stacked on a side of a light incidence surface of the first photoelectric conversion section, wherein
the second photoelectric conversion section has sensitivity to a visible light having a wavelength in a visible light region; and
a multilayer film between the first photoelectric conversion section and the second photoelectric conversion section, wherein the multilayer film includes:
a plurality of semiconductor layers, wherein
in each semiconductor layer of the plurality of semiconductor layers, a value of a first optical constant k1 for the visible light having the wavelength in the visible light region is larger than a value of a second optical constant k2 for the infrared light having the wavelength in the infrared light region,
optical constants k each serves as an extinction coefficient that includes an imaginary part of a complex refractive index, and
the optical constants k include the first optical constant k1 and the second optical constant k2; and
a plurality of dielectric layers, wherein
the plurality of semiconductor layers and the plurality of dielectric layers are alternately stacked,
the multilayer film has an optical distance of 0.3 µm or more and 10 µm or less in a stack direction, and
the multilayer film is configured to absorb at least a portion of the visible light and transmit the infrared light.

8. The imaging element according to claim 7, wherein the plurality of semiconductor layers comprises:
a first semiconductor layer;
a second semiconductor layer; and
a third semiconductor layer, and
the plurality of dielectric layers comprises:
a first dielectric layer; and
a second dielectric layer, wherein
the first semiconductor layer, the first dielectric layer, the second semiconductor layer, the second dielectric layer, and the third semiconductor layer are stacked in this order from a side of a light incidence surface of the second photoelectric conversion section.

9. The imaging element according to claim 7, wherein the each semiconductor layer of the plurality of semiconductor layers includes one of silicon, germanium, or silicon germanium or an amorphous material thereof.

10. The imaging element according to claim 7, wherein each dielectric layer of the plurality of dielectric layers includes one of silicon oxide, silicon nitride, silicon oxynitride, silicon carbide, aluminum oxide, or magnesium fluoride.

11. The imaging element according to claim 7, further comprising
a fixed electric charge layer and an anti-reflection layer between the first photoelectric conversion section and the multilayer film, wherein
the fixed electric charge layer and the anti-reflection layer are stacked in order from a side of the first photoelectric conversion section.

12. The imaging element according to claim 7, further comprising
a first optical film on a side of a light incidence surface of the second photoelectric conversion section, wherein
the first optical film is configured to transmit light in a specific wavelength band, and
the specific wavelength band corresponds-corresponding to a color component.

13. The imaging element according to claim 12, further comprising
a second optical film, wherein
the first optical film is closer to the side of the light incidence surface of the second photoelectric conversion section than the second optical film, and
the second optical film is configured to selectively transmitting transmit the visible light having the wavelength in the visible light region and the infrared light having the wavelength in the infrared light region.

14. The imaging element according to claim 7, further comprising
a semiconductor substrate comprising:
a first surface; and
a second surface opposite to the first surface, wherein
the first photoelectric conversion section is buried in the semiconductor substrate, and
the second photoelectric conversion section is on a side of the first surface of the semiconductor substrate.

15. The imaging element according to claim 14, wherein the semiconductor substrate further includes:
a through electrode that extends between the first surface and the second surface of the semiconductor substrate; and
a readout circuit provided on a side of the second surface, wherein
the readout circuit is configured to output a signal based on electric charge outputted from the second photoelectric conversion section through the through electrode.

* * * * *